US011758238B2

(12) United States Patent
Davies et al.

(10) Patent No.: US 11,758,238 B2
(45) Date of Patent: Sep. 12, 2023

(54) SYSTEMS AND METHODS FOR DISPLAYING WIND CHARACTERISTICS AND EFFECTS WITHIN A BROADCAST

(71) Applicant: Fox Sports Productions, Inc., Los Angeles, CA (US)

(72) Inventors: Michael Davies, Los Angeles, CA (US); Zachary Fields, Woodland Hills, CA (US); David Eric Shanks, Los Angeles, CA (US)

(73) Assignee: FOX SPORTS PRODUCTIONS, LLC, Los Angeles, CA (US)

(*) Notice: Subject to any disclaimer, the term of this patent is extended or adjusted under 35 U.S.C. 154(b) by 434 days.

(21) Appl. No.: 15/535,243

(22) PCT Filed: Dec. 14, 2015

(86) PCT No.: PCT/US2015/065477
§ 371 (c)(1),
(2) Date: Jun. 12, 2017

(87) PCT Pub. No.: WO2016/094895
PCT Pub. Date: Jun. 16, 2016

(65) Prior Publication Data
US 2017/0366866 A1 Dec. 21, 2017

Related U.S. Application Data

(63) Continuation-in-part of application No. 14/804,637, filed on Jul. 21, 2015, now Pat. No. 9,288,545.
(Continued)

(51) Int. Cl.
*H04N 21/488* (2011.01)
*H04N 21/422* (2011.01)
(Continued)

(52) U.S. Cl.
CPC ... *H04N 21/4882* (2013.01); *H04N 21/42202* (2013.01); *H04N 21/4312* (2013.01);
(Continued)

(58) Field of Classification Search
CPC ............. H04N 21/4882; H04N 21/854; H04N 21/8146; H04N 21/8133; H04N 21/4312;
(Continued)

(56) References Cited

U.S. PATENT DOCUMENTS 4,184,270 A   1/1980   Presbrey
4,679,068 A   7/1987   Lillquist et al.
(Continued)

FOREIGN PATENT DOCUMENTS

CA       2213485 A1    2/1995
CN       101090472     12/2007
(Continued)

OTHER PUBLICATIONS

Mike—More homers? Blame the seats; Published Apr. 20, 2009 (Year: 2009).*
(Continued)

*Primary Examiner* — Junior O Mendoza
(74) *Attorney, Agent, or Firm* — CANTOR COLBURN LLP

(57) ABSTRACT

The present disclosure presents an improved system and method for displaying wind characteristics and effects in a broadcast. The method comprises utilizing a camera to record a broadcast, determining wind characteristics relative to the broadcast, and rendering graphics in a broadcast displaying the wind. In exemplary embodiments, wind is sampled via at least one sampling point in a venue and wind characteristics are displayed in the broadcast.

19 Claims, 40 Drawing Sheets

Related U.S. Application Data

(60) Provisional application No. 62/091,502, filed on Dec. 13, 2014.

(51) Int. Cl.
  *H04N 21/431* (2011.01)
  *H04N 21/478* (2011.01)
  *H04N 21/81* (2011.01)
  *H04N 21/854* (2011.01)

(52) U.S. Cl.
  CPC ..... *H04N 21/4781* (2013.01); *H04N 21/8133* (2013.01); *H04N 21/8146* (2013.01); *H04N 21/854* (2013.01)

(58) Field of Classification Search
  CPC .......... H04N 21/4781; H04N 21/42202; A63F 2300/663; A63F 2300/69; G06T 2207/30228
  See application file for complete search history.

(56) References Cited

U.S. PATENT DOCUMENTS

| | | | |
|---|---|---|---|
| 4,975,770 A | 12/1990 | Troxell | |
| 5,342,051 A | 8/1994 | Rankin et al. | |
| 5,413,345 A | 5/1995 | Nauck | |
| 5,489,099 A | 2/1996 | Rankin et al. | |
| 5,517,236 A | 5/1996 | Sergeant et al. | |
| 5,729,471 A | 3/1998 | Jain et al. | |
| 5,789,519 A | 8/1998 | Vock et al. | |
| 5,865,624 A | 2/1999 | Hayashigawa | |
| 5,892,554 A | 4/1999 | Dicicco et al. | |
| 5,938,545 A | 8/1999 | Cooper et al. | |
| 5,953,056 A | 9/1999 | Tucker | |
| 6,100,925 A | 8/2000 | Rosser et al. | |
| 6,144,375 A | 11/2000 | Jain et al. | |
| 6,154,250 A | 11/2000 | Honey et al. | |
| 6,201,554 B1 | 3/2001 | Lands | |
| 6,224,492 B1 | 5/2001 | Grimes | |
| 6,233,007 B1 | 5/2001 | Carlbom et al. | |
| 6,236,940 B1 | 5/2001 | Rudow et al. | |
| 6,449,010 B1 | 9/2002 | Tucker | |
| 6,520,864 B1 | 2/2003 | Wilk | |
| 6,525,690 B2 | 2/2003 | Rudow et al. | |
| 6,750,919 B1 | 6/2004 | Rosser | |
| 6,774,932 B1* | 8/2004 | Ewing | A63B 69/36 348/157 |
| 6,958,772 B1 | 10/2005 | Sugimori | |
| 7,158,676 B1 | 1/2007 | Rainsford | |
| 7,250,952 B2* | 7/2007 | Johnson | G06T 15/503 345/473 |
| 7,315,631 B1 | 1/2008 | Corcoran et al. | |
| 7,356,082 B1 | 4/2008 | Kuhn | |
| 7,380,259 B1* | 5/2008 | Schroeder | G01W 1/04 345/418 |
| 7,450,758 B2 | 11/2008 | Cohen et al. | |
| 7,529,298 B2 | 5/2009 | Yasuda | |
| 7,693,679 B1 | 4/2010 | Warnke et al. | |
| 7,839,926 B1 | 11/2010 | Metzger et al. | |
| 7,843,510 B1 | 11/2010 | Ayer et al. | |
| 7,873,910 B2 | 1/2011 | Chaudhri et al. | |
| 7,996,771 B2 | 8/2011 | Girgensohn et al. | |
| 8,077,917 B2 | 12/2011 | Forsgren | |
| 8,381,259 B1 | 2/2013 | Khosla | |
| 8,495,697 B1 | 7/2013 | Goldfeder et al. | |
| 8,648,857 B2 | 2/2014 | Williams | |
| 8,682,417 B2 | 3/2014 | Huff | |
| 8,702,504 B1 | 4/2014 | Hughes et al. | |
| 8,743,219 B1 | 6/2014 | Bledsoe | |
| 8,756,641 B2 | 6/2014 | Ivanov et al. | |
| 8,949,889 B1 | 2/2015 | Erdmann | |
| 9,094,615 B2 | 7/2015 | Aman et al. | |
| 9,137,558 B2 | 9/2015 | Gibbon et al. | |
| 9,138,652 B1 | 9/2015 | Thompson et al. | |
| 9,288,545 B2 | 3/2016 | Hill et al. | |
| 9,535,879 B2 | 1/2017 | Allen | |
| 2002/0019258 A1 | 2/2002 | Kim et al. | |
| 2002/0057217 A1 | 5/2002 | Milnes et al. | |
| 2002/0082122 A1 | 6/2002 | Pippin et al. | |
| 2002/0090217 A1 | 7/2002 | Limor et al. | |
| 2002/0118875 A1 | 8/2002 | Wilensky | |
| 2002/0168006 A1 | 11/2002 | Yasuda | |
| 2003/0009270 A1 | 1/2003 | Breed | |
| 2003/0021445 A1 | 1/2003 | Larice et al. | |
| 2003/0033602 A1 | 2/2003 | Gibbs et al. | |
| 2003/0103648 A1 | 6/2003 | Ito et al. | |
| 2003/0151835 A1 | 8/2003 | Su et al. | |
| 2003/0210329 A1 | 11/2003 | Aagaard et al. | |
| 2004/0136592 A1 | 7/2004 | Chen et al. | |
| 2004/0218099 A1 | 11/2004 | Washington | |
| 2004/0258154 A1 | 12/2004 | Liu et al. | |
| 2004/0261127 A1 | 12/2004 | Freeman et al. | |
| 2005/0040710 A1 | 2/2005 | Ahn | |
| 2005/0052533 A1 | 3/2005 | Ito et al. | |
| 2005/0137958 A1 | 6/2005 | Huber et al. | |
| 2005/0147278 A1 | 7/2005 | Rui et al. | |
| 2005/0237385 A1 | 10/2005 | Kosaka et al. | |
| 2005/0255914 A1 | 11/2005 | McHale et al. | |
| 2006/0003825 A1* | 1/2006 | Iwasaki | A63F 13/10 463/2 |
| 2006/0044410 A1 | 3/2006 | Shinkai et al. | |
| 2006/0078047 A1 | 4/2006 | Shu et al. | |
| 2006/0078329 A1 | 4/2006 | Ohnishi et al. | |
| 2006/0197839 A1 | 9/2006 | Senior et al. | |
| 2006/0197843 A1 | 9/2006 | Yoshimatsu | |
| 2006/0197849 A1 | 9/2006 | Wernersson | |
| 2007/0018952 A1 | 1/2007 | Arseneau et al. | |
| 2007/0024706 A1 | 2/2007 | Brannon, Jr. et al. | |
| 2007/0076957 A1 | 4/2007 | Wang et al. | |
| 2007/0139562 A1 | 6/2007 | Miyake | |
| 2007/0198939 A1* | 8/2007 | Gold | G06T 15/00 715/757 |
| 2008/0019299 A1 | 1/2008 | Lekutai et al. | |
| 2008/0021651 A1* | 1/2008 | Seeley | A63B 24/0021 702/3 |
| 2008/0129825 A1 | 6/2008 | Deangelis et al. | |
| 2008/0129844 A1 | 6/2008 | Cusack et al. | |
| 2008/0175441 A1 | 7/2008 | Matsumoto et al. | |
| 2008/0192116 A1 | 8/2008 | Tamir et al. | |
| 2008/0199043 A1 | 8/2008 | Forsgren | |
| 2008/0261711 A1 | 10/2008 | Tuxen | |
| 2008/0277486 A1 | 11/2008 | Seem et al. | |
| 2008/0311983 A1 | 12/2008 | Koempel et al. | |
| 2009/0003599 A1 | 1/2009 | Hart et al. | |
| 2009/0009605 A1 | 1/2009 | Ortiz | |
| 2009/0021583 A1 | 1/2009 | Salgar et al. | |
| 2009/0028440 A1* | 1/2009 | Elangovan | G06T 7/248 382/216 |
| 2009/0031382 A1 | 1/2009 | Cope | |
| 2009/0037605 A1 | 2/2009 | Li | |
| 2009/0040308 A1 | 2/2009 | Temovskiy | |
| 2009/0046152 A1 | 2/2009 | Aman | |
| 2009/0066782 A1 | 3/2009 | Choi et al. | |
| 2009/0067670 A1 | 3/2009 | Johnson et al. | |
| 2009/0082139 A1 | 3/2009 | Hart | |
| 2009/0136226 A1 | 5/2009 | Wu et al. | |
| 2009/0140976 A1 | 6/2009 | Bae et al. | |
| 2009/0147025 A1* | 6/2009 | Grigsby | H04N 21/2187 345/633 |
| 2009/0160735 A1 | 6/2009 | Mack | |
| 2009/0225845 A1 | 9/2009 | Veremeev et al. | |
| 2009/0245571 A1 | 10/2009 | Chien et al. | |
| 2009/0262137 A1* | 10/2009 | Walker | H04H 60/04 345/629 |
| 2009/0271821 A1 | 10/2009 | Zalewski | |
| 2009/0284601 A1 | 11/2009 | Eledath et al. | |
| 2009/0290848 A1 | 11/2009 | Brown | |
| 2010/0077435 A1 | 3/2010 | Kandekar et al. | |
| 2010/0091017 A1 | 4/2010 | Kmiecik et al. | |
| 2010/0095345 A1 | 4/2010 | Tran et al. | |
| 2010/0141772 A1 | 6/2010 | Inaguma et al. | |
| 2010/0179005 A1* | 7/2010 | Meadows | G01S 19/19 473/407 |

(56) References Cited

U.S. PATENT DOCUMENTS

| | | | |
|---|---|---|---|
| 2010/0192088 A1 | 7/2010 | Iwano | |
| 2010/0208082 A1 | 8/2010 | Buchner et al. | |
| 2010/0265125 A1* | 10/2010 | Kelly | G01S 7/04 |
| | | | 342/179 |
| 2010/0265344 A1 | 10/2010 | Velarde et al. | |
| 2010/0289904 A1 | 11/2010 | Zhang et al. | |
| 2010/0289913 A1 | 11/2010 | Fujiwara | |
| 2010/0321389 A1 | 12/2010 | Gay et al. | |
| 2011/0013087 A1 | 1/2011 | House et al. | |
| 2011/0013836 A1 | 1/2011 | Gefen et al. | |
| 2011/0016497 A1 | 1/2011 | Bloom et al. | |
| 2011/0067065 A1 | 3/2011 | Karaoguz et al. | |
| 2011/0149094 A1 | 6/2011 | Chen et al. | |
| 2011/0149103 A1 | 6/2011 | Hatakeyama et al. | |
| 2011/0157370 A1 | 6/2011 | Livesey | |
| 2011/0169959 A1 | 7/2011 | Deangelis et al. | |
| 2011/0181728 A1 | 7/2011 | Tieman et al. | |
| 2011/0191023 A1 | 8/2011 | Engstrom | |
| 2011/0205022 A1 | 8/2011 | Cavallaro et al. | |
| 2011/0292030 A1* | 12/2011 | Jiang | G01W 1/04 |
| | | | 345/418 |
| 2011/0304843 A1* | 12/2011 | Rogers | G01S 17/95 |
| | | | 356/27 |
| 2012/0060101 A1 | 3/2012 | Vonog et al. | |
| 2012/0090010 A1 | 4/2012 | Dace et al. | |
| 2012/0154145 A1 | 6/2012 | Anson et al. | |
| 2012/0154593 A1 | 6/2012 | Anderson | |
| 2012/0277036 A1* | 11/2012 | Lee | A63B 69/3623 |
| | | | 473/409 |
| 2012/0295679 A1 | 11/2012 | Izkovsky et al. | |
| 2012/0316843 A1 | 12/2012 | Beno et al. | |
| 2012/0331387 A1 | 12/2012 | Lemmey et al. | |
| 2013/0016099 A1 | 1/2013 | Rinard et al. | |
| 2013/0033605 A1 | 2/2013 | Davies et al. | |
| 2013/0041755 A1 | 4/2013 | Ivanov | |
| 2013/0211774 A1 | 8/2013 | Bentley et al. | |
| 2013/0227596 A1 | 8/2013 | Pettis et al. | |
| 2014/0005929 A1 | 1/2014 | Gale et al. | |
| 2014/0229996 A1 | 8/2014 | Ellis et al. | |
| 2014/0236331 A1 | 8/2014 | Lehmann et al. | |
| 2014/0240500 A1 | 8/2014 | Davies | |
| 2014/0245367 A1 | 8/2014 | Sasaki et al. | |
| 2014/0266160 A1 | 9/2014 | Coza | |
| 2014/0344839 A1 | 11/2014 | Woods et al. | |
| 2015/0057108 A1 | 2/2015 | Regimbal et al. | |
| 2015/0062339 A1 | 3/2015 | Ostrom | |
| 2015/0094883 A1 | 4/2015 | Peeters et al. | |
| 2015/0149250 A1 | 5/2015 | Fein et al. | |
| 2015/0149837 A1 | 5/2015 | Alonso et al. | |
| 2015/0226828 A1 | 8/2015 | Davies et al. | |
| 2015/0234454 A1 | 8/2015 | Kurz | |
| 2015/0318020 A1 | 11/2015 | Pribula | |
| 2015/0370818 A1 | 12/2015 | Des Jardins et al. | |
| 2015/0382076 A1* | 12/2015 | Davisson | H04H 20/04 |
| | | | 725/62 |
| 2016/0173958 A1 | 6/2016 | Ryu et al. | |
| 2016/0198228 A1 | 7/2016 | Hill et al. | |
| 2016/0203694 A1 | 7/2016 | Hogsten et al. | |
| 2016/0217345 A1 | 7/2016 | Appel et al. | |
| 2017/0201779 A1 | 7/2017 | Publicover et al. | |
| 2017/0280199 A1 | 9/2017 | Davies et al. | |
| 2017/0366867 A1 | 12/2017 | Davies et al. | |
| 2019/0213720 A1* | 7/2019 | Urashita | G06T 5/001 |
| 2020/0107075 A1 | 4/2020 | Davies et al. | |
| 2021/0306598 A1 | 9/2021 | Davies et al. | |

FOREIGN PATENT DOCUMENTS

| | | | |
|---|---|---|---|
| EP | 2575079 | 4/2013 | |
| JP | H06105231 A | 4/1994 | |
| JP | H07141022 A | 6/1995 | |
| JP | H08164896 | 6/1996 | |
| JP | H0952555 | 2/1997 | |
| JP | 2001268562 | 9/2001 | |
| JP | 2003125414 A | 4/2003 | |
| JP | 2003162213 A | 6/2003 | |
| JP | 2003242517 | 8/2003 | |
| JP | 2004048116 | 2/2004 | |
| JP | 2004056473 | 2/2004 | |
| JP | 2004354236 | 12/2004 | |
| JP | 2004354256 | 12/2004 | |
| JP | 2005073218 | 3/2005 | |
| JP | 2005159385 A | 6/2005 | |
| JP | 2005 144003 | * 9/2005 | H04N 21/8146 |
| JP | 2006081696 A | 3/2006 | |
| JP | 2006340108 A | 12/2006 | |
| JP | 2008005110 | 1/2008 | |
| JP | 2008035006 | 2/2008 | |
| JP | 2008199370 | 8/2008 | |
| JP | 20080199370 | 8/2008 | |
| JP | 2009188976 A | 8/2009 | |
| JP | 2009194234 | 8/2009 | |
| JP | 2010005267 A | 1/2010 | |
| JP | 2010152556 A | 7/2010 | |
| JP | 2010194074 A | 9/2010 | |
| JP | 2010245821 | 10/2010 | |
| JP | 2011108165 | 6/2011 | |
| JP | 2011130112 | 6/2011 | |
| JP | 2011183138 A | 9/2011 | |
| JP | 2011527527 A | 10/2011 | |
| JP | 2012034365 | 2/2012 | |
| JP | 2012095914 A | 5/2012 | |
| JP | 2013020308 | 1/2013 | |
| JP | 2013118712 A | 6/2013 | |
| KR | 20060134702 | 12/2006 | |
| KR | 1020090056047 | 6/2009 | |
| KR | 20130086814 | 8/2013 | |
| KR | 20140023136 | 2/2014 | |
| WO | 9728856 | 8/1997 | |
| WO | 0114021 | 3/2001 | |
| WO | 0228093 | 4/2002 | |
| WO | 2005027516 | 3/2005 | |
| WO | 2008057285 | 5/2008 | |
| WO | 2010019024 | 2/2010 | |
| WO | 2010140858 | 12/2010 | |
| WO | 2012051054 | 4/2012 | |
| WO | 2014036363 | 3/2014 | |

OTHER PUBLICATIONS

Newton—Autodesk wind simulation to enhance Fox Sports Super Bowl coverage; Published Jan. 31, 2014 (Year: 2014).*

JP Patent Application No. 2014-525086 English Translation of Trial Decision issued Apr. 3, 2018, 17 pages.

JP Patent Application No. 2016-501836 Notice of Reasons for Refusal dated May 18, 2018, 6 pages.

U.S. Appl. No. 14/424,632 Non-Final Office Action dated Jun. 28, 2018, 44 pages.

Australian Patent Application No. 2012294568 Office Action dated Aug. 22, 2016, 3 pages.

Austrialian Application No. 2014244374 Examination Report No. 1, dated Mar. 17, 2017, 3 pages.

China Application No. 201280044974.9 Second Office Action dated Jul. 22, 2016, 10 pages.

CN Application No. 201280044974.9 First Office Action and Search Report dated Sep. 30, 2015, 14 pages.

EP Application No. 12822586.9 Extended European Search Report dated Feb. 5, 2015, 6 pages.

EP Application No. 12822586.9 Office Action dated Feb. 28, 2017, 4 pages.

EP Application No. 13832174.0 Extended European Search Report dated Mar. 23, 2016, 9 pages.

EP Application No. 13832174.0 Office Action dated Apr. 25, 2017, 4 pages.

EP Application No. 14776040.9 Extended European Search Report dated Oct. 7, 2016, 8 pages.

EP Application No. 15156533 Office Action dated May 15, 2017, 4 pages.

EP Application No. 15156533.0 Extended European Search Report dated Jun. 10, 2015, 6 pages.

(56) References Cited

OTHER PUBLICATIONS

International Application No. PCT/US2013/057450 International Search Report and Written Opinion dated Dec. 27, 2013, 12 pages.
International Application No. PCT/US2014/025362 International Search Report and Written Opinion dated Aug. 19, 2014, 15 pages.
International Application No. PCT/US2015/065472 International Search Report and Written Opinion dated Apr. 5, 2016, 14 pages.
International Application No. PCT/US2015/065474 International Search Report and Written Opinion dated May 4, 2016, 12 pages.
International Application No. PCT/US2015/065477 International Search Report and Written Opinion dated May 4, 2016, 11 pages.
International Application No. PCT/US2015/065481 International Search Report and Written Opinion dated May 4, 2016, 12 pages.
JP Patent Application No. 2014-525086 Decision of Rejection dated Nov. 8, 2016, 4 pages.
JP Patent Application No. 2014-525086 Notice of Reasons for Rejection dated May 10, 2016, 5 pages.
New Zealand Application No. 620992 First Examination Report dated Jul. 15, 2014, 2 pages.
New Zealand Patent Application No. 620992 Further Examination Report dated Feb. 1, 2016, 3 pages.
New Zealand Patent Application No. 715962 First Examination Report dated Feb. 1, 2016, 2 pages.
New Zealand Patent Application No. 719619 First Examination Report dated May 19, 2016, 3 pages.
PCT Application No. PCT/US2012/049707 Written Opinion and International Search Report dated Jan. 7, 2013, 13 pages.
U.S. Appl. No. 13/567,323 Final Office Action dated Sep. 24, 2015, 31 pages.
U.S. Appl. No. 13/567,323 Non-final Office Action dated Apr. 26, 2016, 35 pages.
U.S. Appl. No. 13/567,323 Non-Final Office Action dated May 30, 2017, 42 pages.
U.S. Appl. No. 13/567,323 Non-Final Office Action dated Mar. 2, 2015, 30 pages.
U.S. Appl. No. 13/567,323 Final Office Action dated Nov. 10, 2016, 38 pages.
U.S. Appl. No. 14/207,998 Final Office Action dated Sep. 9, 2016, 36 pages.
U.S. Appl. No. 14/207,998 Non-Final Office Action dated Dec. 2, 2015, 33 pages.
U.S. Appl. No. 14/207,998 Non-Final Office Action dated Jun. 30, 2017, 46 pages.
U.S. Appl. No. 14/424,632 Non-Final Office Action dated Nov. 6, 2015, 25 pages.
U.S. Appl. No. 14/804,637 Notice of Allowance dated Nov. 17, 2015, 18 pages.
U.S. Appl. No. 15/068,819 Non-Final Office Action dated May 6, 2016, 21 pages.
EP Application No. 15867985 Supplementary EP Search Report and Written Opinion dated May 30, 2018, 9 pages.
EP Application No. 15868450 Supplementary EP Search Report and Written Opinion dated Jun. 1, 2018, 9 pages.
EP Application No. 15868581 Supplementary EP Search Report and Written Opinion dated Jun. 1, 2018, 8 pages.
First Examination Report for New Zealand IP No. 734221, dated Aug. 28, 2017 (2 pp.).
Further Examination Report for New Zealand IP No. 719619, dated Oct. 16, 2017 (1 pp.).
Further Examination Report for New Zealand IP No. 719619, dated Sep. 20, 2017 (2 pp.).
Notice of Reasons for Refusal for Japanese Patent Application No. 2015-530081, dated Oct. 10, 2017 (10 pp.).
Rodrigues, Pedro. "A Field, Tracking and Video Editor Tool for a Football Resource Planner", IEEE Conference Publications, US, 2013 (6 pp.).
EP Application No. 14776040.9 Office Action dated Dec. 8, 2017, 4 pages.
U.S. Appl. No. 13/567,323 Final Office Action dated Jan. 17, 2018, 44 pages.
U.S. Appl. No. 14/207,998 Final Office Action dated Feb. 22, 2018, 26 pages.
U.S. Appl. No. 15/621,126 Non-Final Office Action dated Dec. 20, 2017, 34 pages.
Australian Application No. 151189D1AU Examination Report No. 1 dated Nov. 27, 2018, 3 pages.
International Application No. PCT/US2018/035007 International Search Report and Written Opinion dated Sep. 17, 2018, 10 pgs.
U.S. Appl. No. 15/535,257 Non-Final Office Action dated Sep. 20, 2018, 51 pages.
Australian Application No. 2017219030 Office Action dated Feb. 12, 2019, 4 pages.
JP Patent Application No. 2016-501836 Notice of Reasons for Refusal dated Jan. 15, 2019, 3 pages.
U.S. Appl. No. 14/424,632 Final Office Action dated Feb. 8, 2019, 27 pages.
NZ Application No. 751181 First Examination Report dated Mar. 21, 2019, 2 pages.
U.S. Appl. No. 15/535,257 Final Office Action dated May 6, 2019, 31 pages.
Golf Relay Broadcast, Proceedings of Workshop of the Institute of Television Engineers of Japan and Institute of Television Engineers of Japan Using Multimedia PC besides Katori, Nov. 26, 1993, vol. 17. No. 74, p. 23-27.
JP Patent Application No. 2017-531612 Notice of Reasons for Refusal dated Jul. 30, 2019, 6 pages.
Relay watch in the "synchronization World Cup 2006" besides ** Group work, broadcast technology, * 6 hall publication incorporated company, Jan. 1, 2007, volume [60th ] No. 1 (716th volume of the set), p. 19-29.
U.S. Appl. No. 13/567,323 Final Office Action dated Sep. 18, 2019, 60 pages.
AU Application No. 2015360249 Examination Report No. 1 dated May 9, 2019, 4 pages.
AU Application No. 2015360250 Examination Report No. 1 dated May 23, 2019, 5 pages.
AU Application No. 2015360251 Examination Report No. 1 dated May 17, 2019, 5 pages.
AU Application No. 2015360252 Examination Report No. 1 dated May 8, 2019, 4 pages.
EP Application No. 15867249.3 Office Action dated Jun. 6, 2019, 8 pages.
EP Application No. 15867985.2 Office Action dated Jun. 6, 2019, 8 pages.
EP Application No. 15868450.6 Office Action dated Jun. 6, 2019, 9 pages.
EP Application No. 15868581.8 Office Action dated Jun. 6, 2019, 7 pages.
JP Patent Application No. 2017-531609 Notice of Reasons for Refusal dated Jun. 18, 2019, 3 pages.
JP Patent Application No. 2017-531610 Notice of Reasons for Refusal dated Jun. 18, 2019, 3 pages.
Au Application No. 2019271924 Examination Report No. 1 dated Nov. 17, 2020, 5 pages.
EP Application No, 15867249.3 Oral Proceedings Summons dated Aug. 25, 2020, 10 pages.
EP Application No, 18809839.6 Extended EP Search Report dated Sep. 11, 2020, 7 pages.
NZ IP No. 768143; First Examination Report; dated Sep. 28, 2020, 2 pages.
AU Application No. 2019271924 Notice of Acceptance for Patent Application dated Nov. 19, 2021, 3 pages.
AU Application No. 2020201003 First Examination Report dated Feb. 26, 2021, 5 pages.
EP Application No. 15867249.3 Decision to Refuse dated Mar. 12, 2021, 13 pages.
EP Application No. 15867249.3 Provisional Opinion re Oral Proceedings issued Feb. 18, 2021, 9 pages.
EP Application No. 15867985.2 Decision to Refuse dated Mar. 12, 2021, 9 pages.
EP Application No. 15867985.2 Provisional Opinion re Oral Proceedings issued Feb. 18, 2021, 6 pages.

(56) References Cited

OTHER PUBLICATIONS

EP Application No. 15868450.6 2 Provisional Opinion re Oral Proceedings issued Feb. 18, 2021, 7 pages.
EP Application No. 15868450.6 Decision to Refuse dated Mar. 15, 2021, 12 pages.
EPP Application No. 18 809 839.6-1209 of May 30, 2018; Communication; dated Feb. 4, 2022; 5 pages.
First Examination Report for NZ Application No. 786618; dated Mar. 30, 2022; 2 pages.
Non-Final Office Action for U.S. Appl. No. 15/535,257; filed Jun. 12, 2017; dated Dec. 13, 2021, 28 pages.
U.S. Appl. No. 15/535,257, filed Jun. 12, 2017; Final Office Action, dated Jul. 1, 2022, 18 pages.

\* cited by examiner

- Different grafic functions
  - ▶ Name Identifier
  - ▶ In-game stats
  - ▶ Season stats
  - ▶ Custom Notes

FIG. 11

SYSTEMS AND METHODS FOR DISPLAYING WIND CHARACTERISTICS AND EFFECTS WITHIN A BROADCAST

CROSS-REFERENCE TO RELATED APPLICATIONS

This patent application claims priority to U.S. Provisional Application No. 62/091,502, filed Dec. 13, 2014, and is a Continuation-In-Part of U.S. patent application Ser. No. 14/804,637 filed Jul. 21, 2015, which is incorporated herein by reference in its entirety.

BACKGROUND

The present disclosure relates to systems and methods for displaying wind characteristics and effects within a broadcast. In exemplary embodiments, the present disclosure relates to improved methods for measuring wind characteristics at a venue or systematically analyzing a broadcast and displaying wind effects within that broadcast.

While general identification of objects within a broadcast has been known, there is room in the field for improvement, for example by displaying wind characteristics within a broadcast, as is described herein.

Accordingly, the following disclosure describes display of wind characteristics within a broadcast, either by sampling wind via at least one sampling point or by analyzing a broadcast to determine wind characteristics therein.

SUMMARY

The present disclosure presents an improved system and method for displaying wind characteristics and effects in a broadcast. The disclosure also relates to tracking and tagging of any kind of objects, inclusive of highlighting of objects and overlays of information, such as distance, projected trajectories, and environmental conditions, such as wind, heat and terrain.

Exemplary embodiments provide a system and method for displaying wind characteristics and effects in a broadcast, comprising: utilizing a camera to record a broadcast; determining wind characteristics relative to the broadcast; and rendering graphics in a broadcast displaying said wind. In exemplary embodiments, wind is sampled via at least one sampling point in a venue and wind characteristics are displayed in the broadcast.

In other exemplary embodiments, wind characteristics are determined from analyzation of said broadcast. In other exemplary embodiments wind is analyzed relative to environmental conditions, such as ground or atmospheric effects of wind.

In other exemplary embodiments, wind effects on objects in the broadcast are displayed, such as effects on a ball, a vehicle and a player, with overlaying a graphic on said broadcast indicative of wind effects.

In exemplary embodiments, one or more objects within a broadcast are tracked (tracking includes locating or identifying) and tagged with information, e.g., information relevant to a play or to performance of an athlete on a field of play.

The above discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the following FIGURES:

FIG. 11 is an illustration of exemplary graphic functions;

DETAILED DESCRIPTION

As was noted above, the present disclosure relates to an improved system and method for displaying wind characteristics and effects in a broadcast. The following disclosure relates generally to tracking and tagging of any kind of objects, but also specifically addresses display of wind.

Tracking and Tagging Objects in General

In exemplary embodiments, one or more objects within a broadcast are tracked and tagged with information, e.g., information relevant to a play or to performance of an athlete on a field of play.

An automated system might track one, a plurality or all players on a field, such that an operator may easily select one or more players during a broadcast. Such selection may permit an operator to supply, or may present one or more pre-selected options, e.g., statistics in general or relevant to a given play (e.g., number of successful completions for a receiver in general or given a particular circumstance), statistics relevant to a given player.

Other exemplary embodiments provide for video overlay of such statistics during (or after) a broadcast of information, e.g., statistics, name, etc., relevant to a player. Such video may be static or dynamic, fully or partially displayed (e.g., when a player moves off the broadcasted display), solid, faded, phased in or out, colored, etc.

It should be noted that partial display of information relates to the idea that tagging need not be specifically related to a displayed broadcast image, but rather to the recorded images, whether selectively displayed or not during a broadcast. Tracking and tagging can be larger than the displayed portion during broadcast, and can wander in and out of the broadcast image itself, as desired or not. Further, delayed tracking, or delayed broadcast is contemplated, to allow an operator or an animator to tag a player of interest, if real time is not sufficient for either or any party. Such tagging may be via linked terminals or via wireless devices, such as tablets, which are either generally associated with the network or specifically identified to the network (e.g., assigned to a specific animator, operator, etc.).

Exemplary embodiments also provide for tracking of one or plural players across a field, wherein the video information perfectly or imperfectly follows a player during play motion. Imperfect follow may be desired in certain circumstances, e.g., to enhance the perceived motion of the player, e.g., during breaking of a tackle, a particular cut or breakout move. Further, rise or fade of a statistic graphic can be strategically orchestrated to prevent distraction from a play but also to provide unobtrusive secondary information to a viewer of broadcast content. The various attached FIGURES illustrate the point, e.g., partial entry of Andrew Hawkins (this is a simulated overlay on an established game) for a kickoff return.

Figure 1:
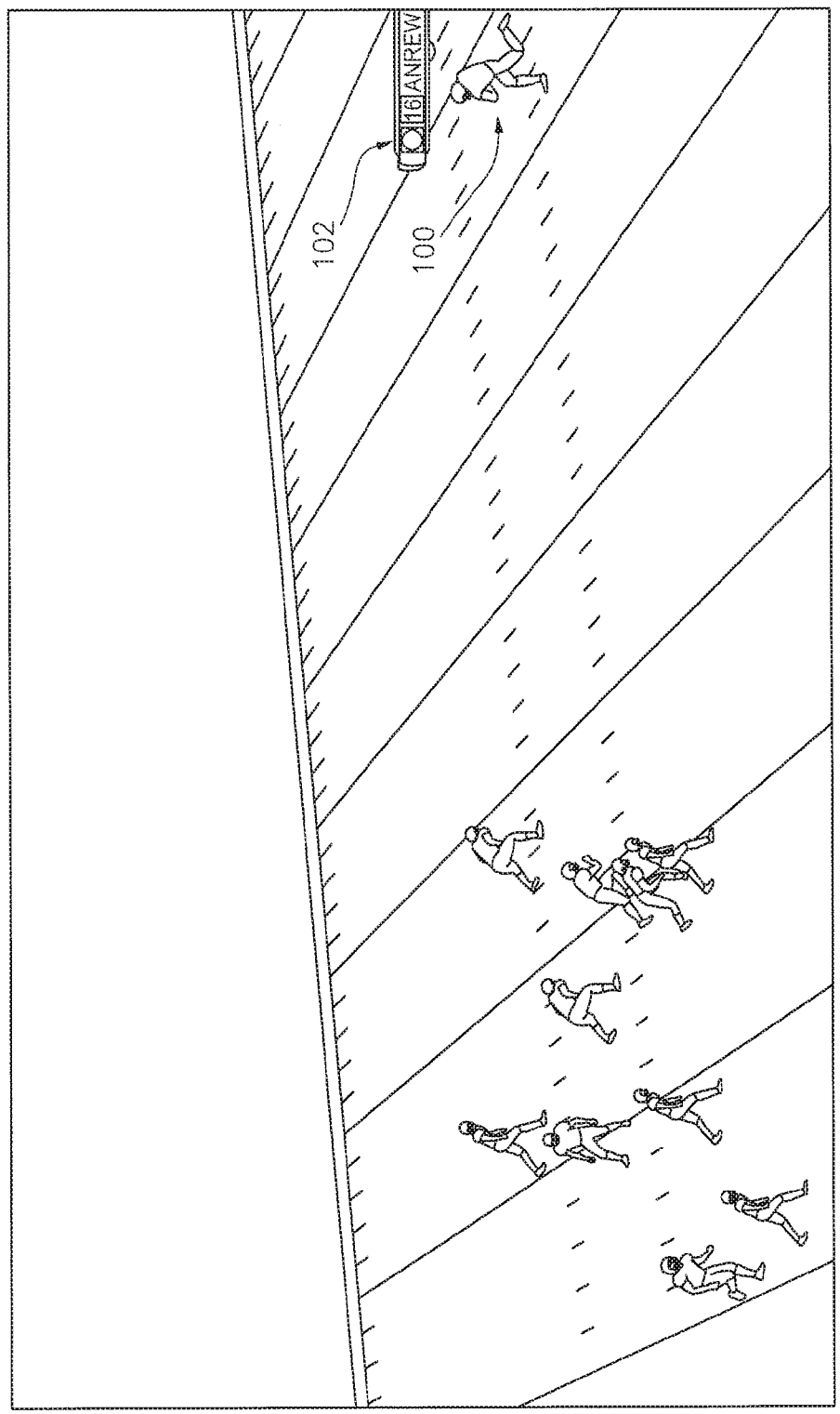
FIG. 1 is an illustration of an exemplary tracked athlete on a field of play.
Figure 2:
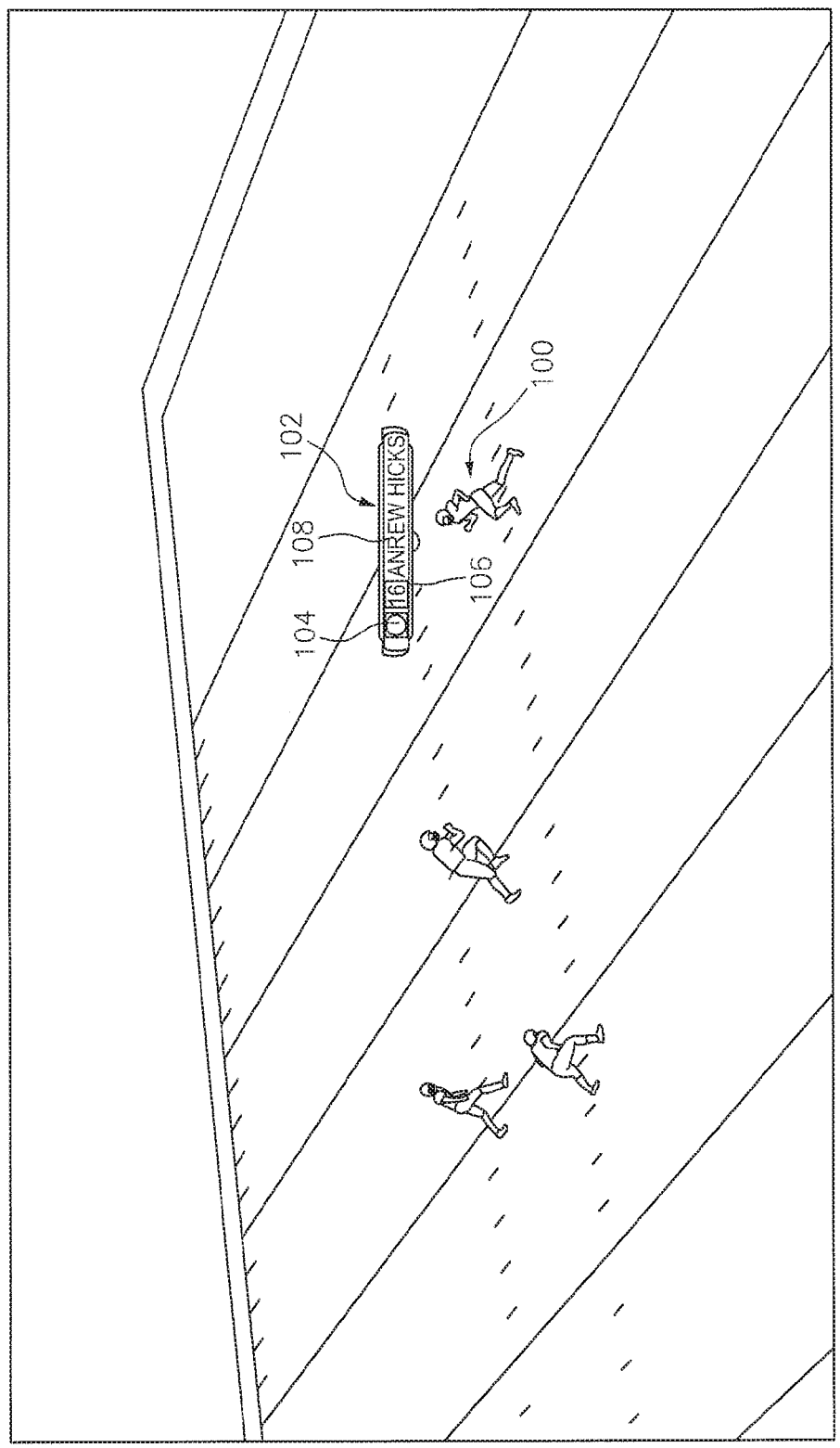
FIG. 2 is another illustration of an exemplary tracked athlete on a field of play.
Figure 3:
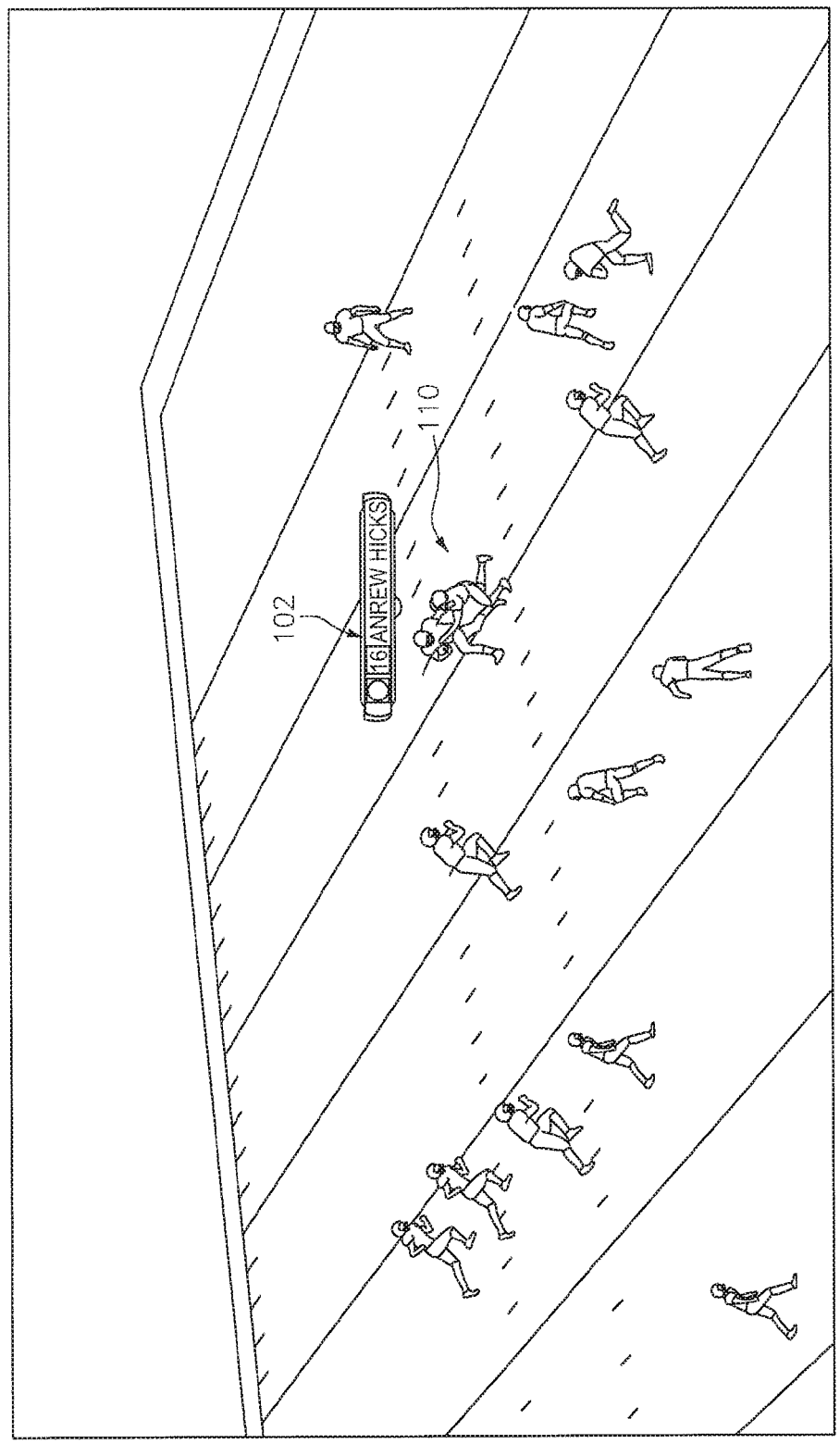
FIG. 3 is an illustration of an exemplary tracked athlete with faded statistics.

For example, FIG. 1 illustrates Andrew Hawkins, shown generally at 100, entering a right hand frame of a punt return. In this sequence, Hawkins is tracked, but the overlay, shown generally at 102, optionally only displays part of his information (since he is only just within the frame). As he moves into the frame, e.g. at FIG. 2, his information 102 is completely illustrated, in this case team 104, number 106 and name 108. At FIG. 3, we see a tackle, shown generally at 110, between ten and fifteen yards, and optionally, his information fades from the broadcast.

Figure 4:
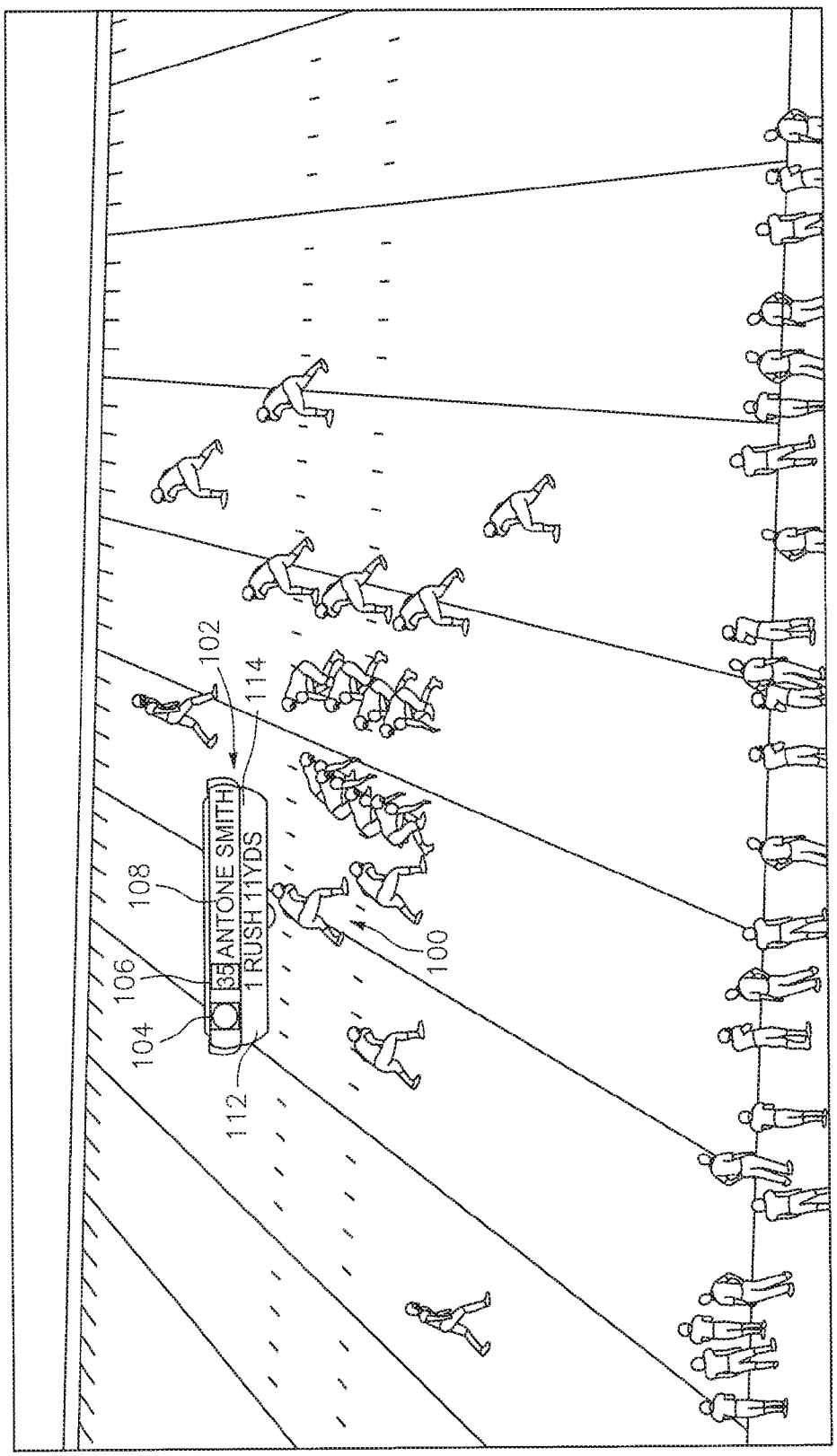
FIG. 4 is an illustration of an exemplary tracked athlete with additional player statistics.
Figure 5:
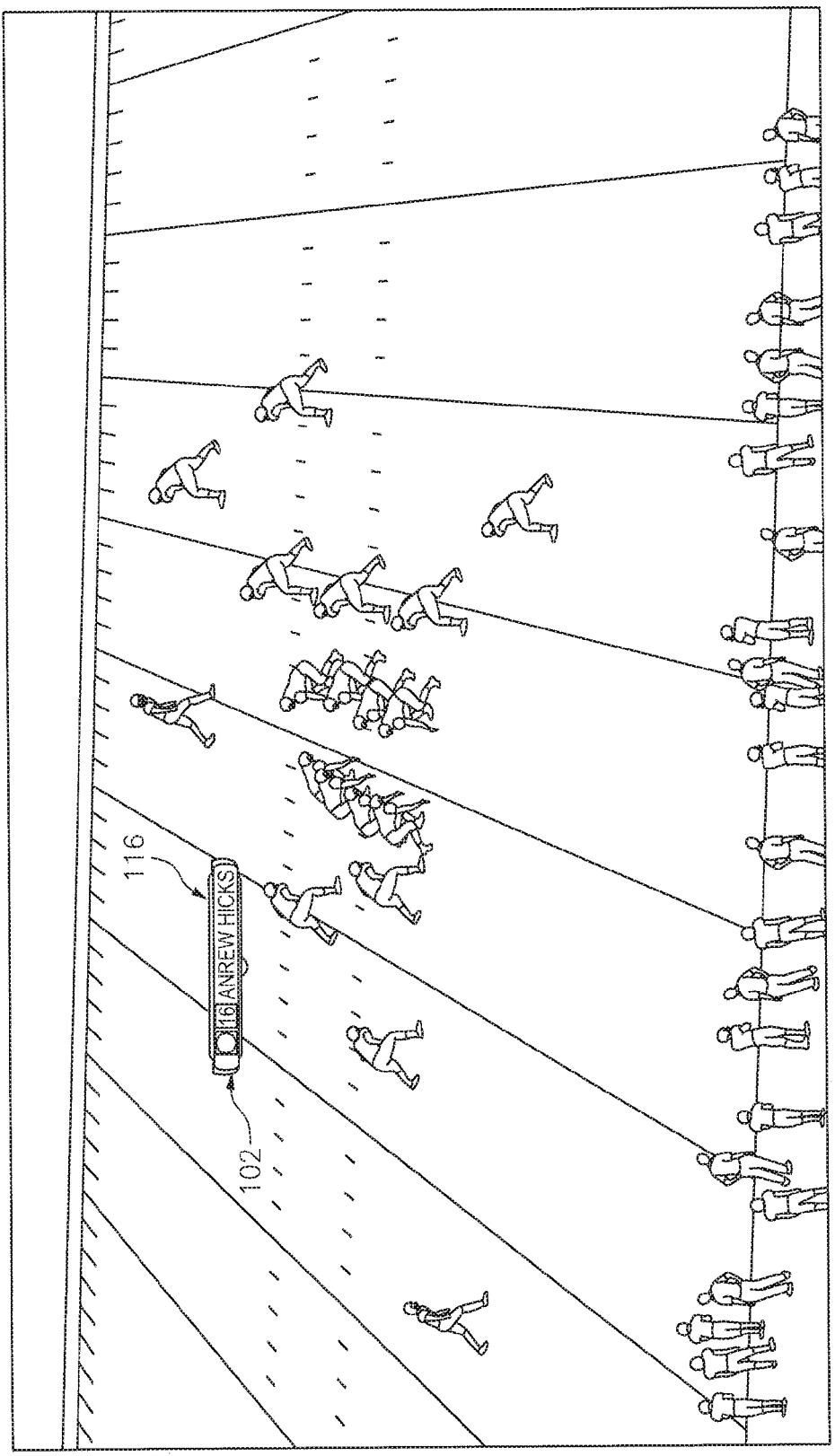
FIG. 5 is another illustration of an exemplary tracked athlete with faded statistics.

A similar example is proved at FIGS. 4-5, wherein Antone Smith 100 is shown in position on a first and ten play, without significant play (other than spreading of defense), with fully displayed information 102, in this case team 104, number 106, name 108, rushing 112 and yardage 114, followed by fade of the animation immediately prior to the action, shown generally at 116 in FIG. 5.

Figure 6:
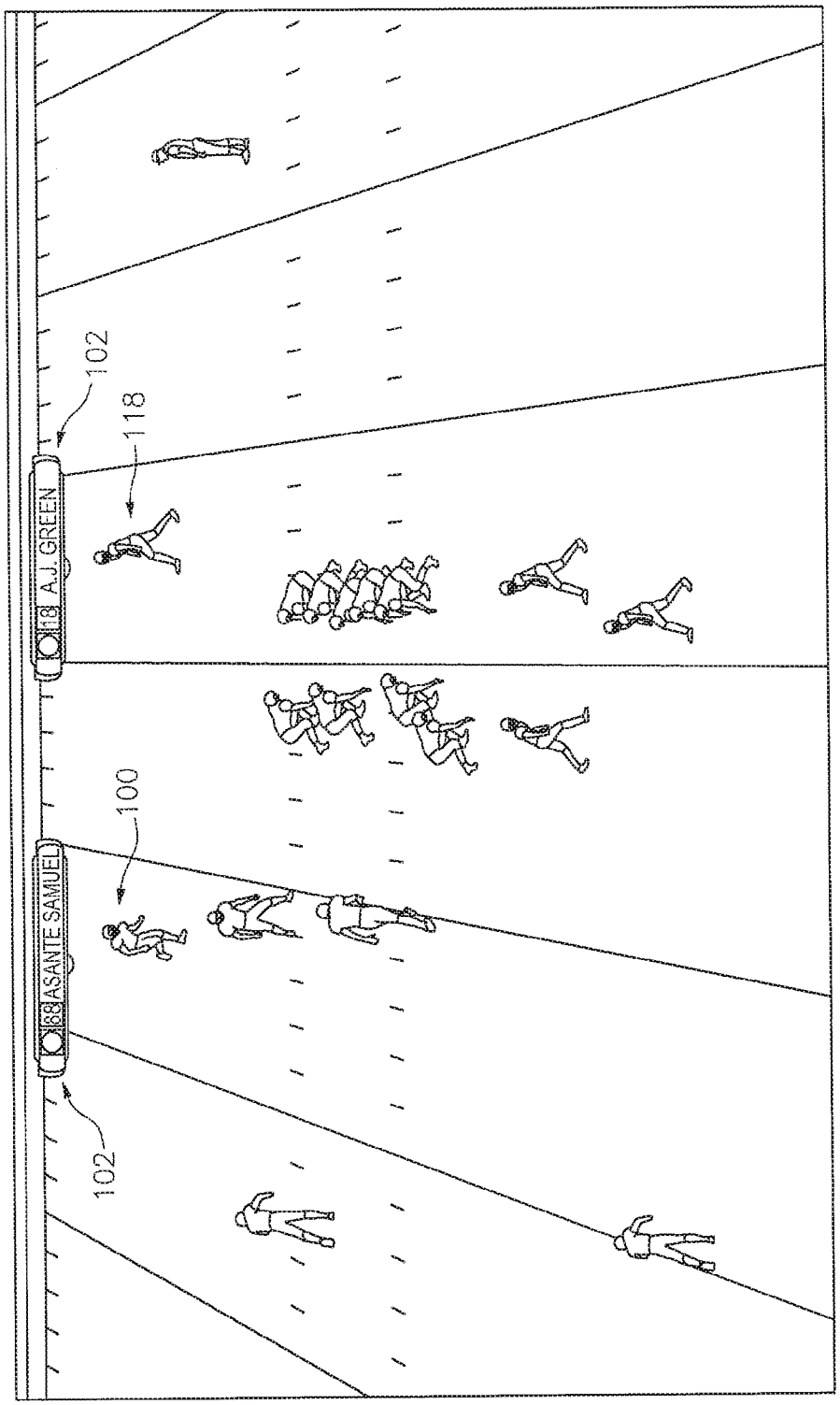
FIG. 6 is an illustration of plural exemplary tracked athletes.
Figure 7:
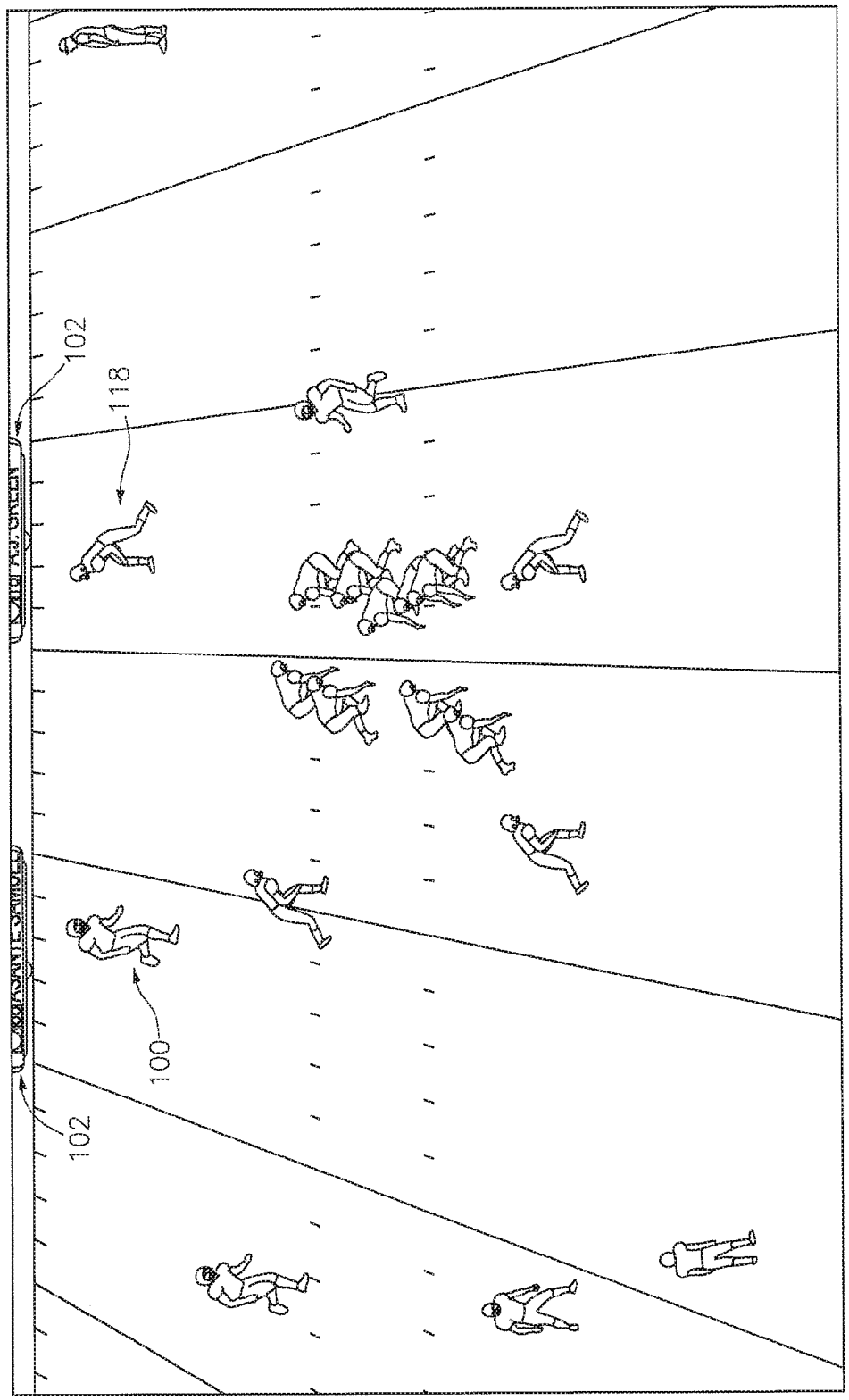
FIG. 7 is an illustration of exemplary tracked athletes with partially displayed statistics.

FIGS. 6-7 illustrate plural tracked players (in this case two), shown generally at 100 and 118, respectively, though the number of possible tracked objects (balls, lines, field marks, coaches, other marks)/players should not be limited in the present disclosure. In this case, Asante Samuel 100 and A. J. Green 118 face off, but in FIG. 7, as the broadcast image shifts, the tagged information 102 partially moves off-screen for the broadcast.

Figure 8:
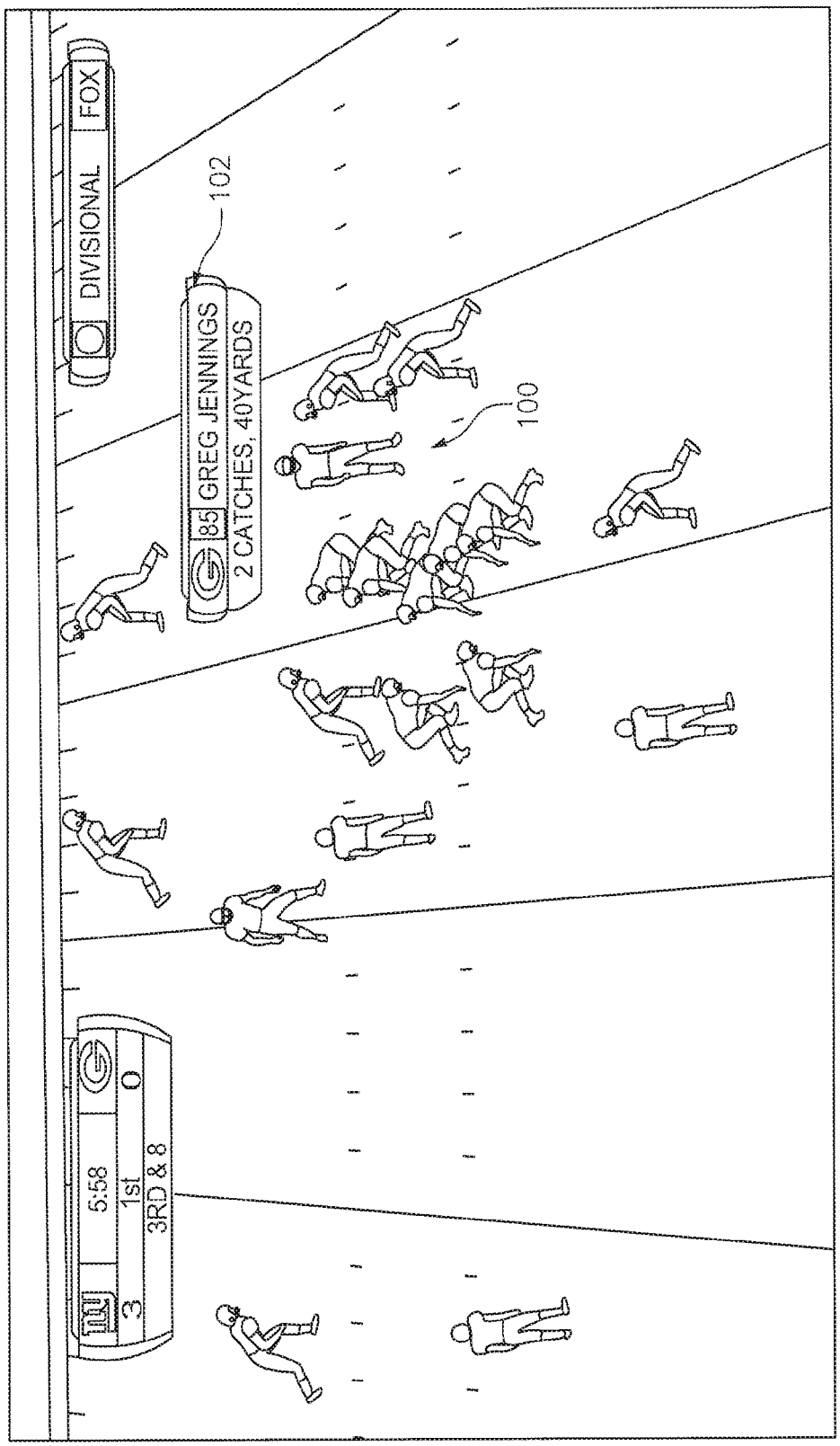
FIG. 8 is an illustration of an exemplary tracked athlete with game statistics.
Figure 9:
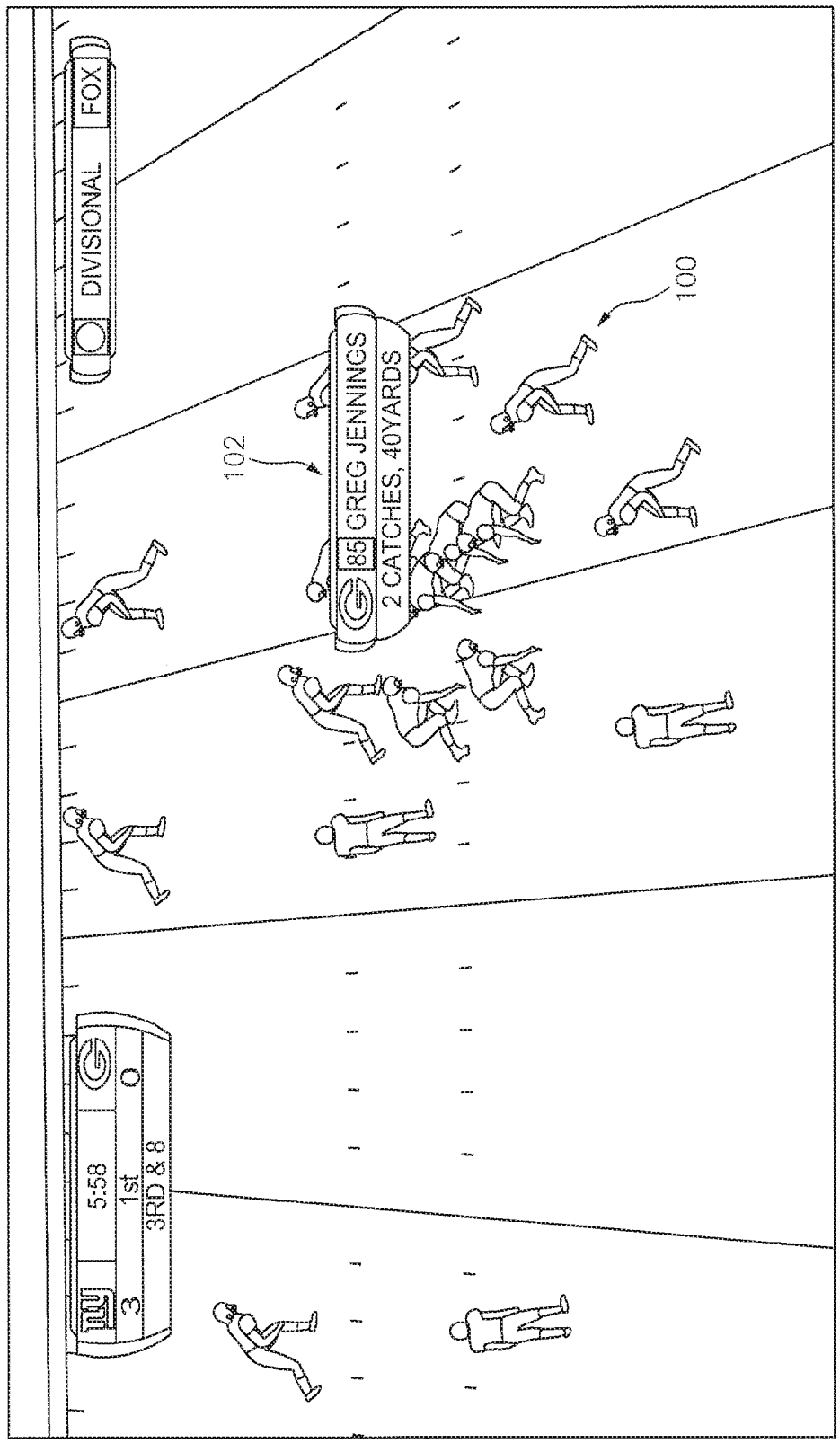
FIG. 9 is an illustration of an exemplary tracked athlete with disappearing statistics.

FIGS. 8 and 9 provide another example of tagging, wherein Greg Jennings 100 is clearly tagged at 102 in FIG. 8 during a play shift, followed by FIG. 9 at the snap with the tagged information 102 fading so as not to distract from the play.

The presently described systems and methods advantageously provide tracking of objects (e.g., players) of any number. One embodiment provides tracking of five players on each side of an event (e.g., basketball). Others provide tracking of the five for each, plus the "sixth man," i.e., certain or all of the fans, or commentator, (e.g., Dick Vitale), such that interesting events outside the actual field can be either automatically or manually recognized as potentially valuable to broadcast. An automatic identification can be related to prior recognized statistics or importance (e.g., game, series, etc. statistics, social media relevance, celebrity status, etc.).

Figure 10:
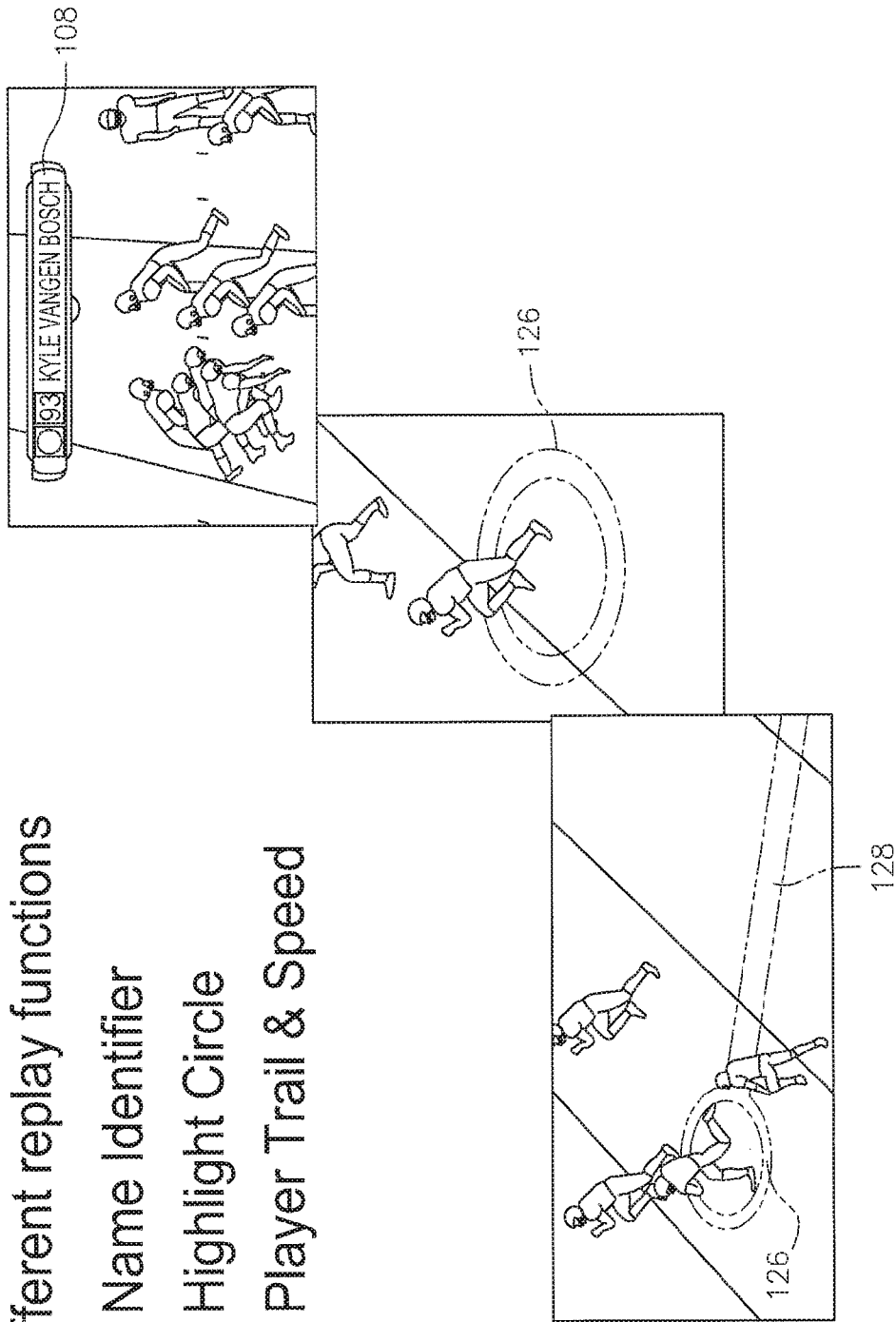
FIG. 10 is an illustration of an exemplary replay functions.

Advantageously, exemplary present systems and methods provide for plural replay functions, e.g., name identifier 108, highlight circle 126 (replay halos, which may be done post production), player trail and speed 128, as is illustrated in FIG. 10. Further, various graphic functions may be employed, as in FIG. 11 or otherwise, including, e.g., name identifier 108, in-game stats 120, season stats 122, player or coach comments and custom notes 124.

Figure 23:
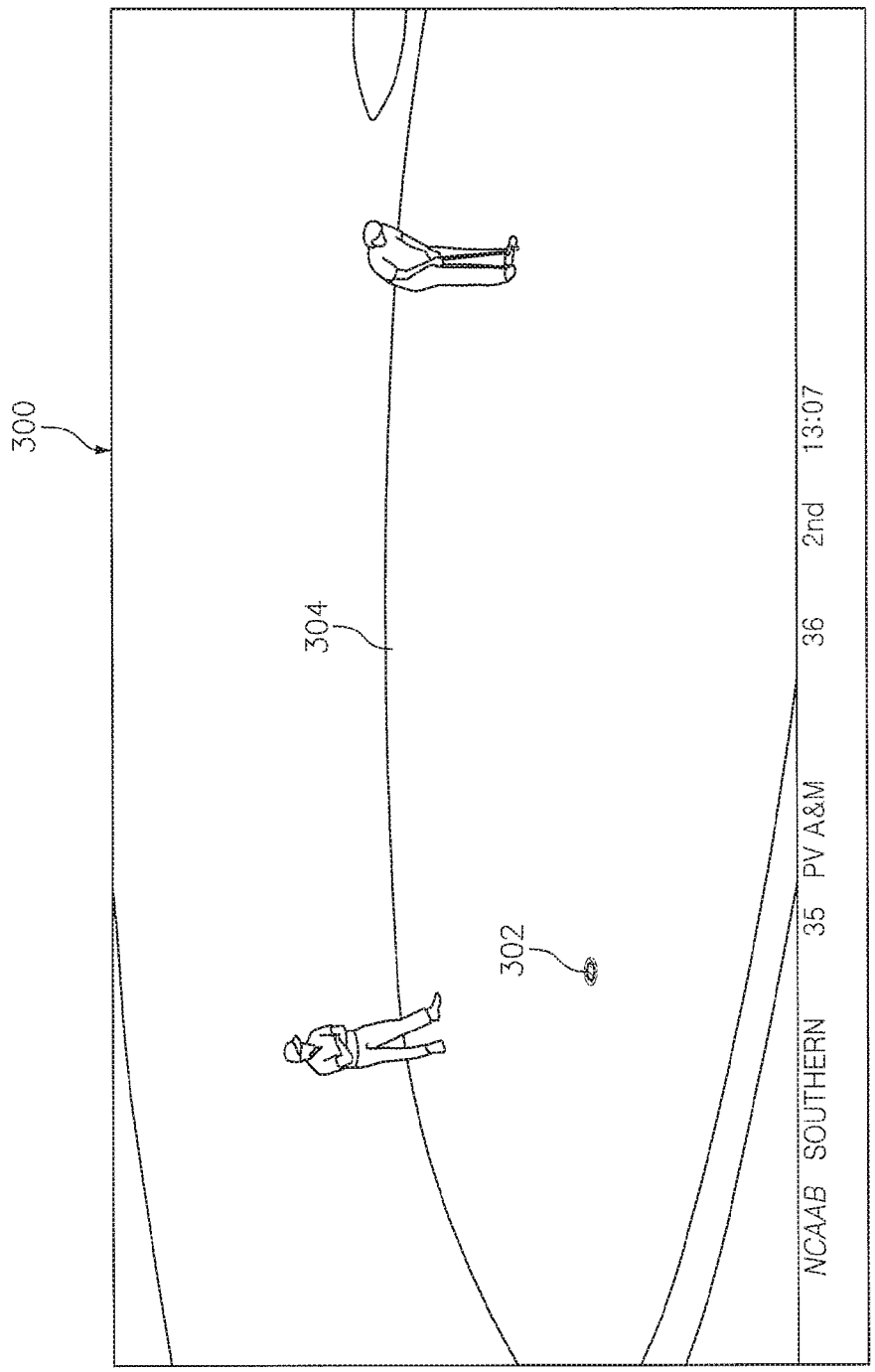
FIG. 23 illustrates an exemplary golf screenshot with highlighting.

Other exemplary embodiments are described in the context of an exemplary golf application. For example, players, golf balls, golf holes, terrain, etc., may be tracked or tagged. Such items may be highlighted or otherwise emphasized for better broadcast visibility and tracking of play. FIG. 23 illustrates exemplary highlighting of a hole 302 on a green 304 of a golf course, shown generally at 300.

Figure 24:
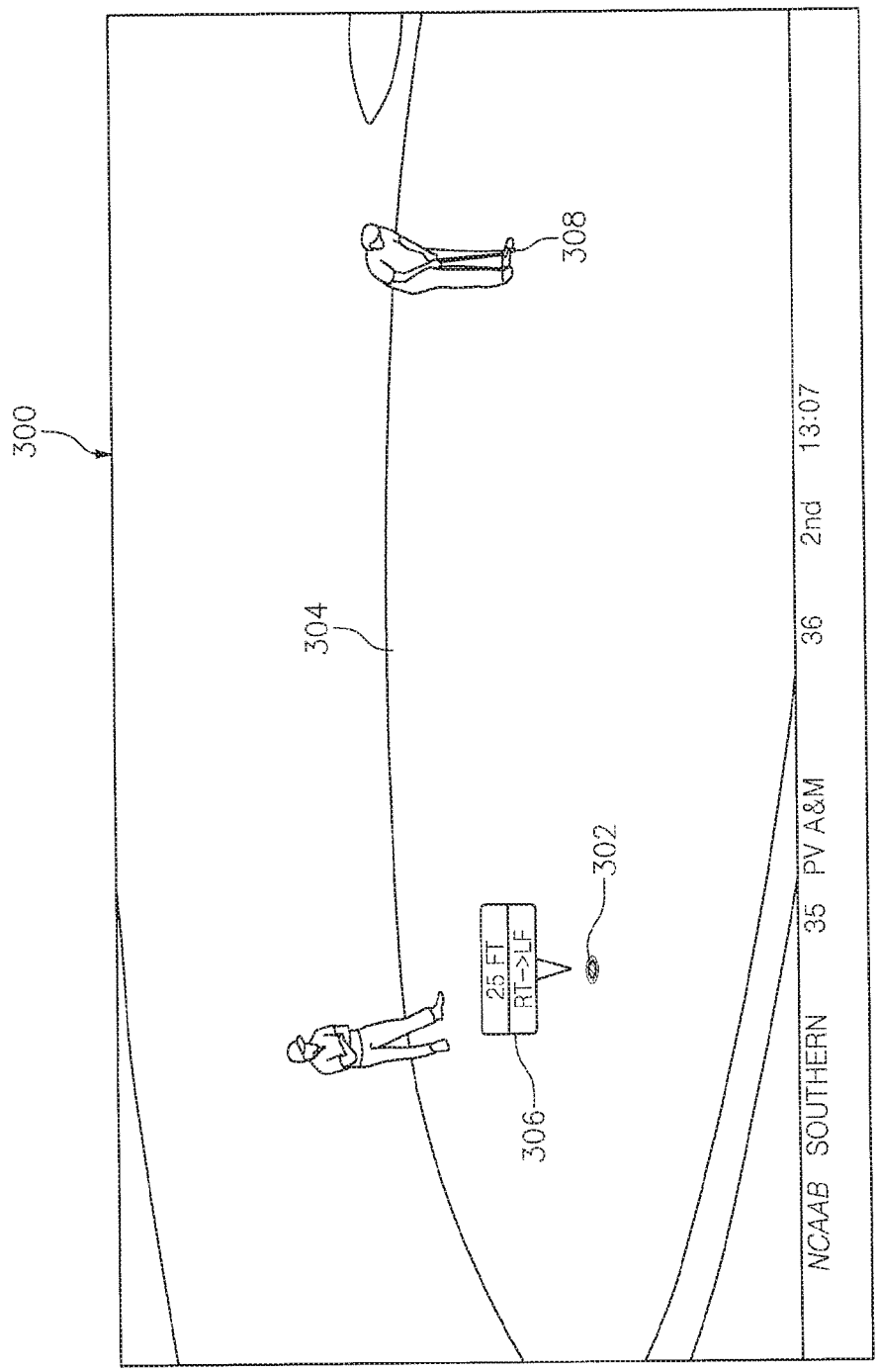
FIG. 24 illustrates an exemplary golf screenshot with highlighting and additional overlays.
Figure 25:
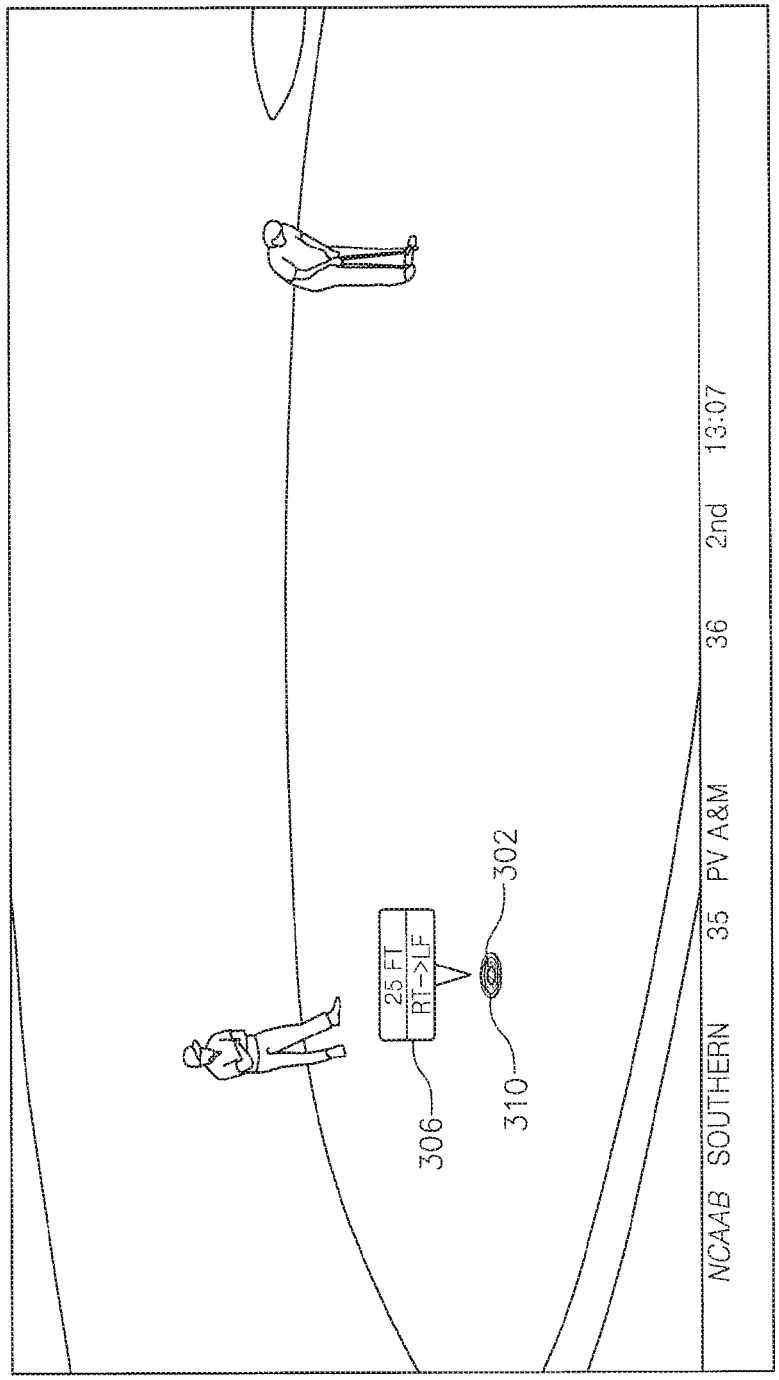
FIG. 25 illustrates another exemplary golf screenshot with highlighting and additional overlays.

Additionally, information overlays, such as rangefinder information, terrain grades or other environmental conditions, such as wind or temperature information may be provided. FIG. 24 illustrates, in addition to highlighting of a hole 302, the addition of an exemplary information overlay 306, in this case describing distance to the hole 302 from a golf ball 308, as well as information as to the terrain, in this case that the terrain breaks right to left. FIG. 25 illustrates an additional overlaid ring 310 around hole 302 for better visibility.

Figure 26:
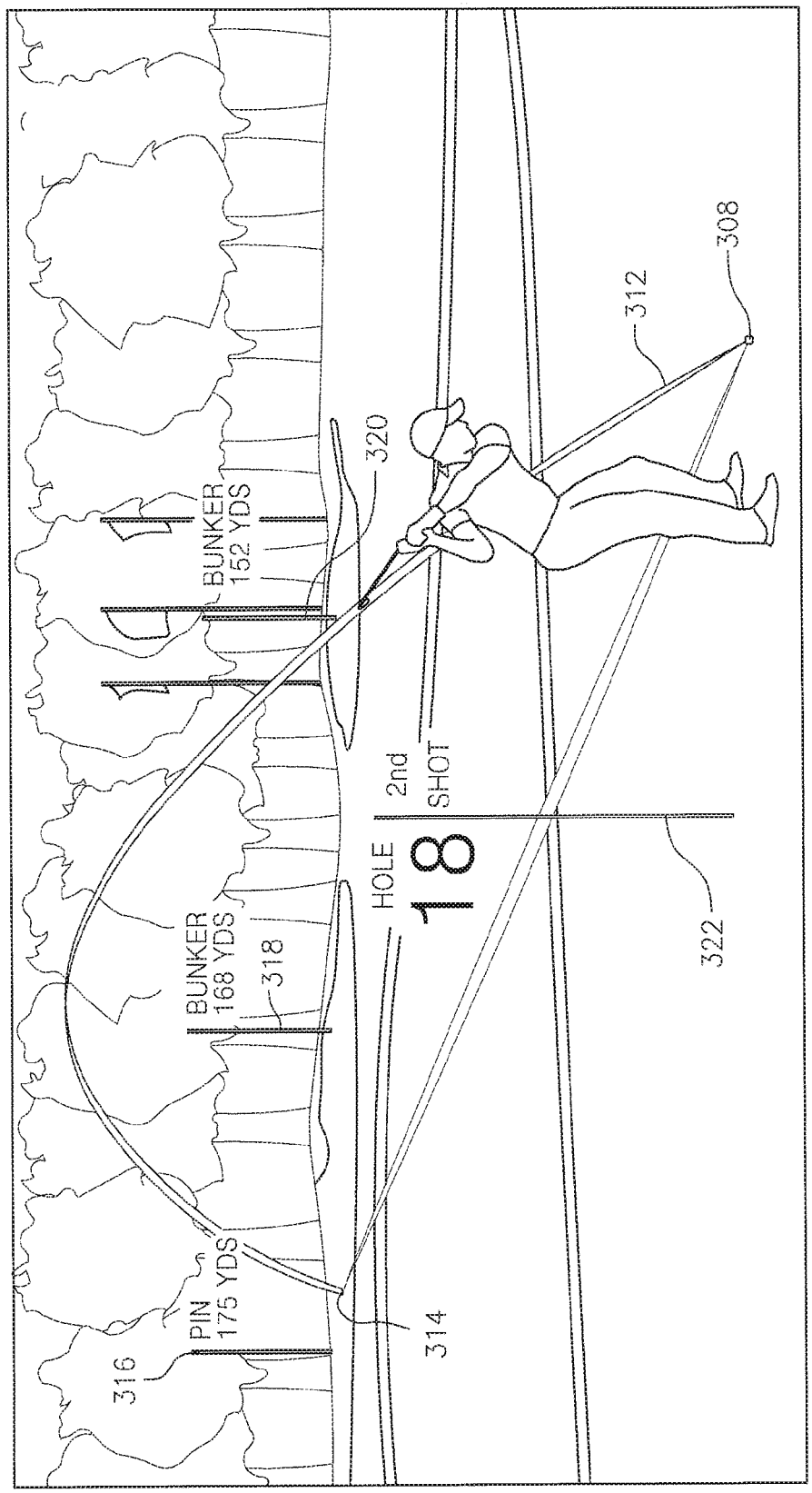
FIG. 26 illustrates an exemplary golf screenshot with range information and other overlays.

With regard to distances, in exemplary embodiments, an on-air broadcast camera can be calibrated to show distances from a golfer (or other point of interest) to regions of interest on a golf course. These distances can be pre-set or chosen live on-air to highlight something specific. FIG. 26 illustrates a projected trajectory 312 from the ball 308 to the pin 314 as well as information overlays with identification and distances from the ball 308 to the pin and two bunkers, shown generally at 316, 318 and 320. FIG. 26 also shows an information overlay 322 indicating the hole number and stroke count.

Figure 27:
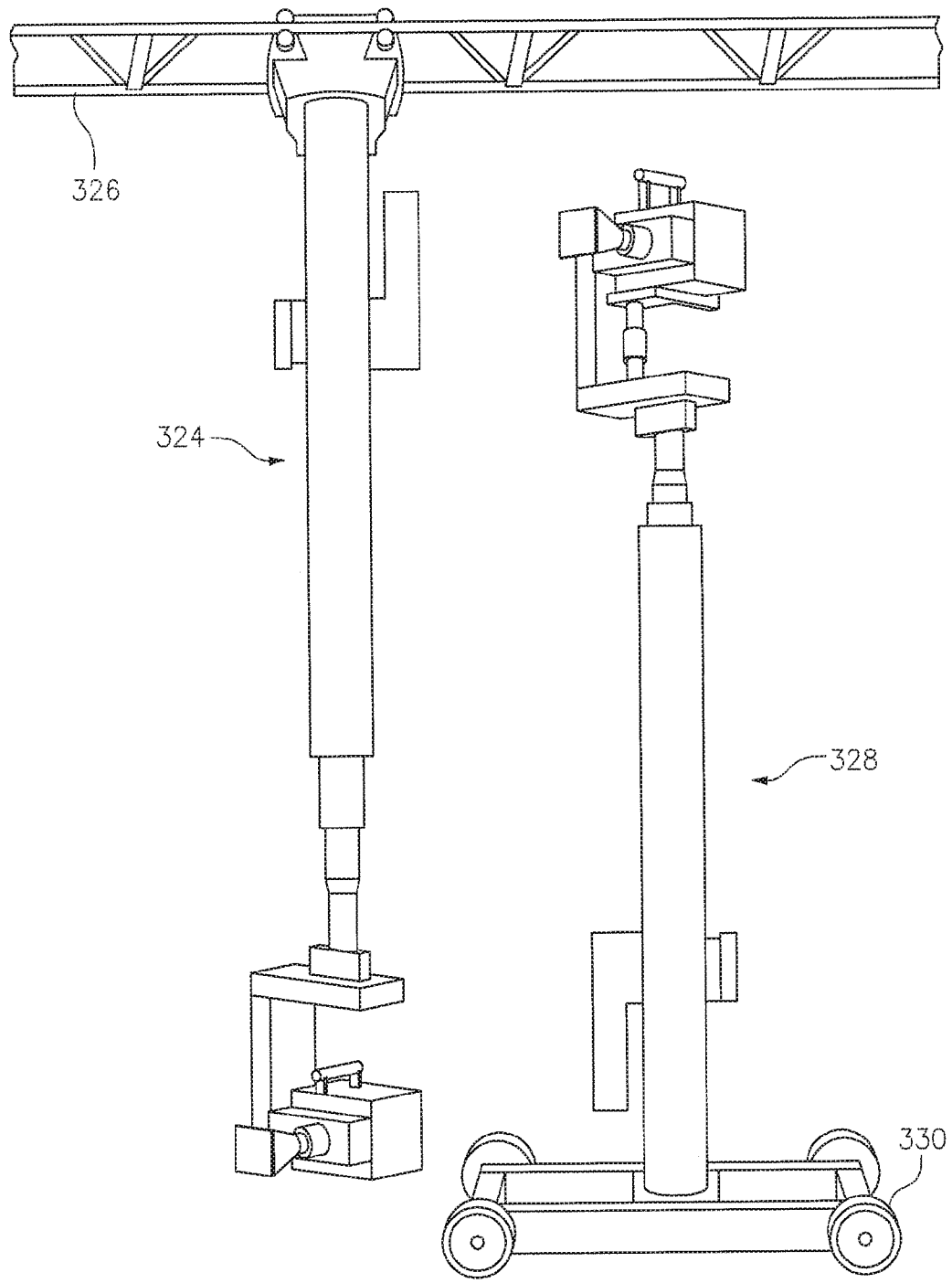
FIG. 27 illustrates an exemplary camera system.

In other exemplary embodiments, alternate views, such as ball path or trajectory views may also be shown or artificially generated and overlaid or substituted for primary feeds, or provided as second screen views. Exemplary views include virtual flyovers, with or without player shots, which may be dynamically or manually plotted. Tracking may be assisted with GPS, radar, plural cameras (including elevated cameras, drones, high contrast cameras, etc.), and/or references tied to or associated with particular courses or course portions, among others. FIG. 27 illustrates exemplary fairway cameras, with a first camera 324 being suspended from an overhead track 326 and a second camera 328 movable via wheels 330.

Figure 28:
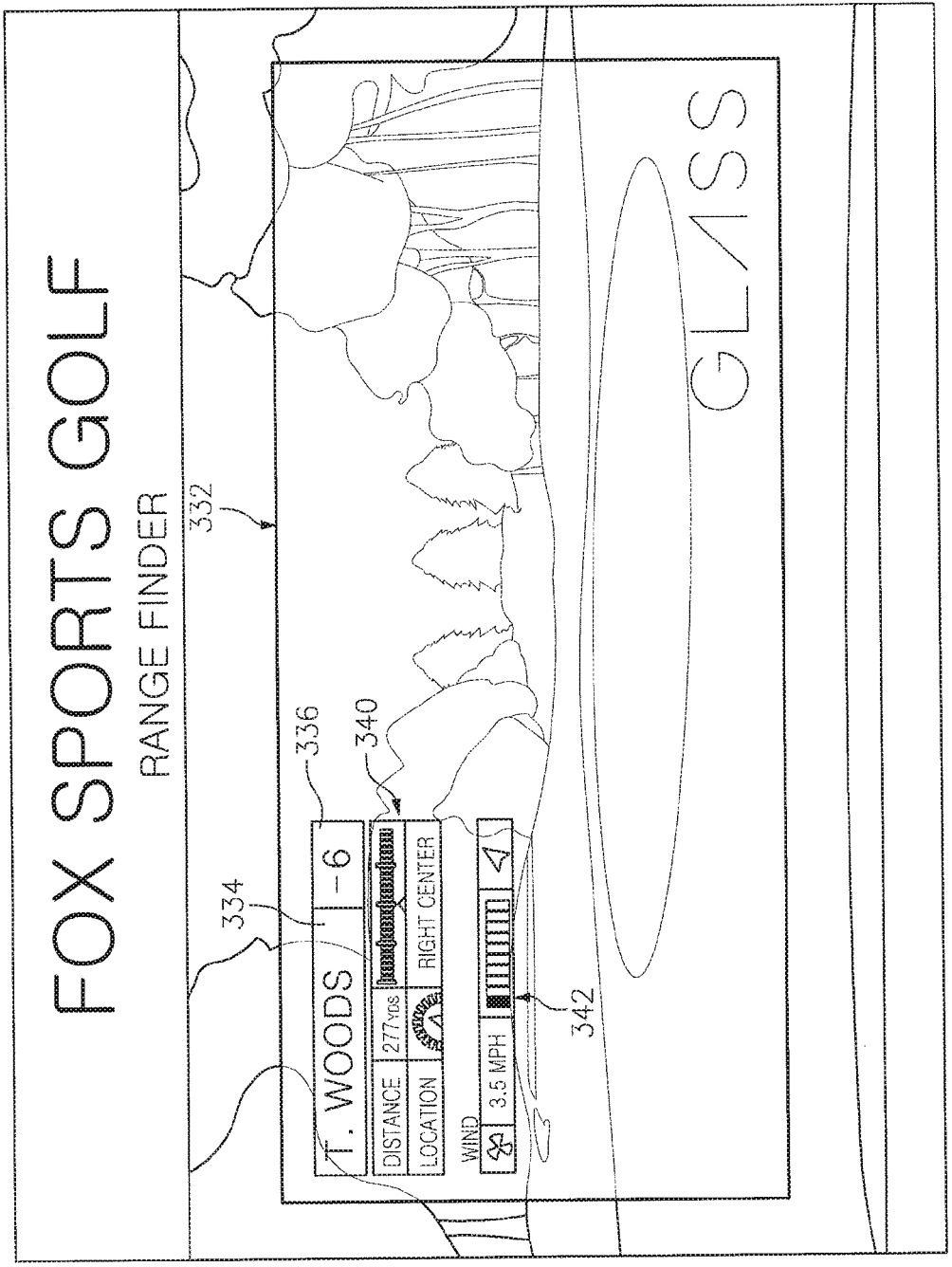
FIG. 28 illustrates an exemplary golf screenshot with range and environmental information.

FIG. 28 illustrates an exemplary embodiment of an information overlay 332 such camera(s) or other equipment can provide, in this embodiment including player name 334, stroke count 336, distance to the pin 338, location on the fairway (shown generally at 340 in differing formats), and environmental factors, such as wind (shown generally at 342 in differing formats).

Displaying Wind

Figure 29:
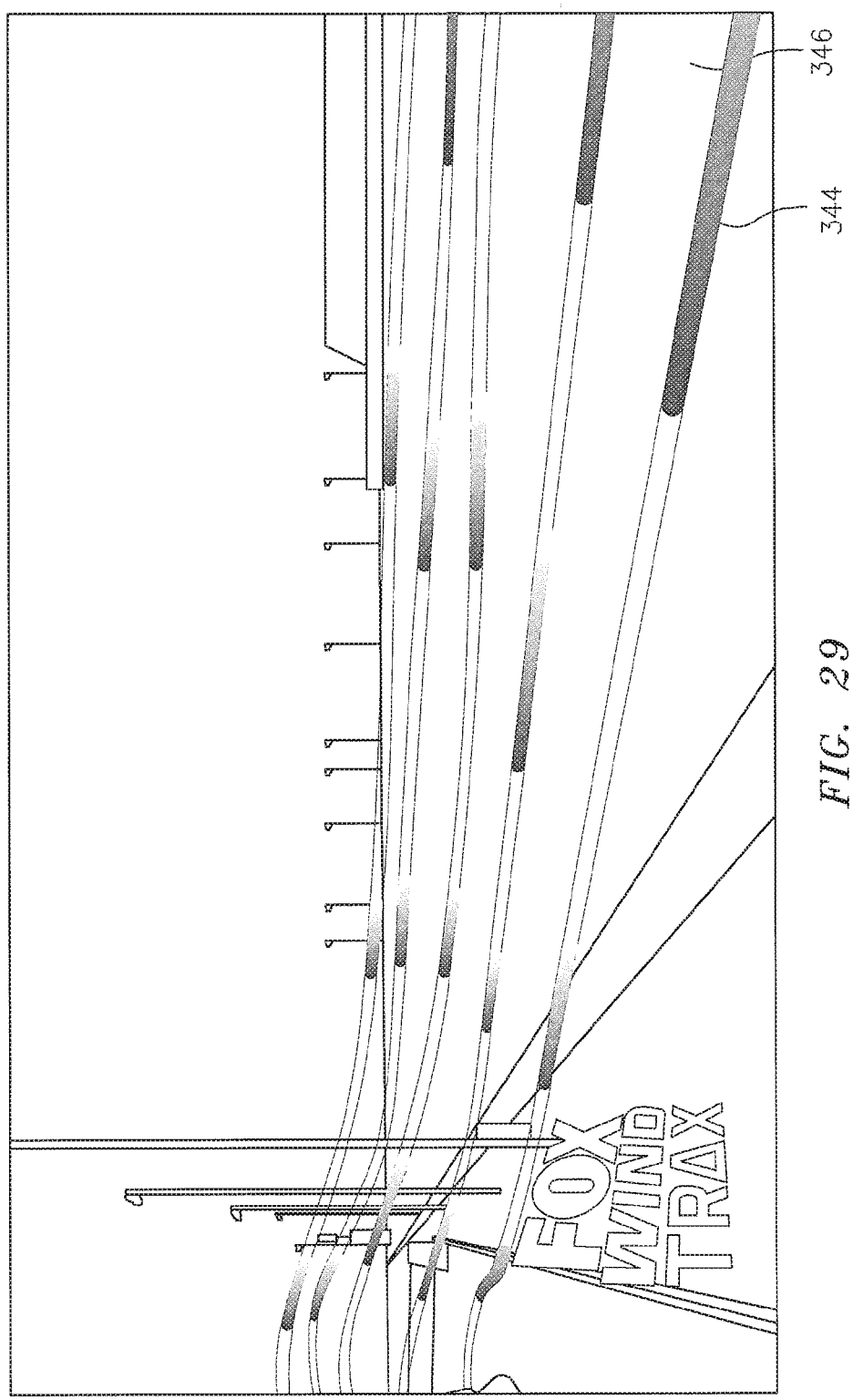
FIG. 29 illustrates an exemplary racing screenshot with wind overlays.

FIG. 29 additionally shows an exemplary environmental overlay illustrating wind effects 344 over a race car track 346. Wind (and other environmental aspects, such as temperature, etc.) may be measured and overlaid or simulated relative to the broadcast. With respect to wind, it may be measured at one end of a venue or venue portion. Simulations of current conditions may be exported to and animated from VIS RT or any enabled 3D renderer, overlaying the field of play. These simulations may be placed in perspective over a live picture and can track and remain in perspective.

Figure 44:
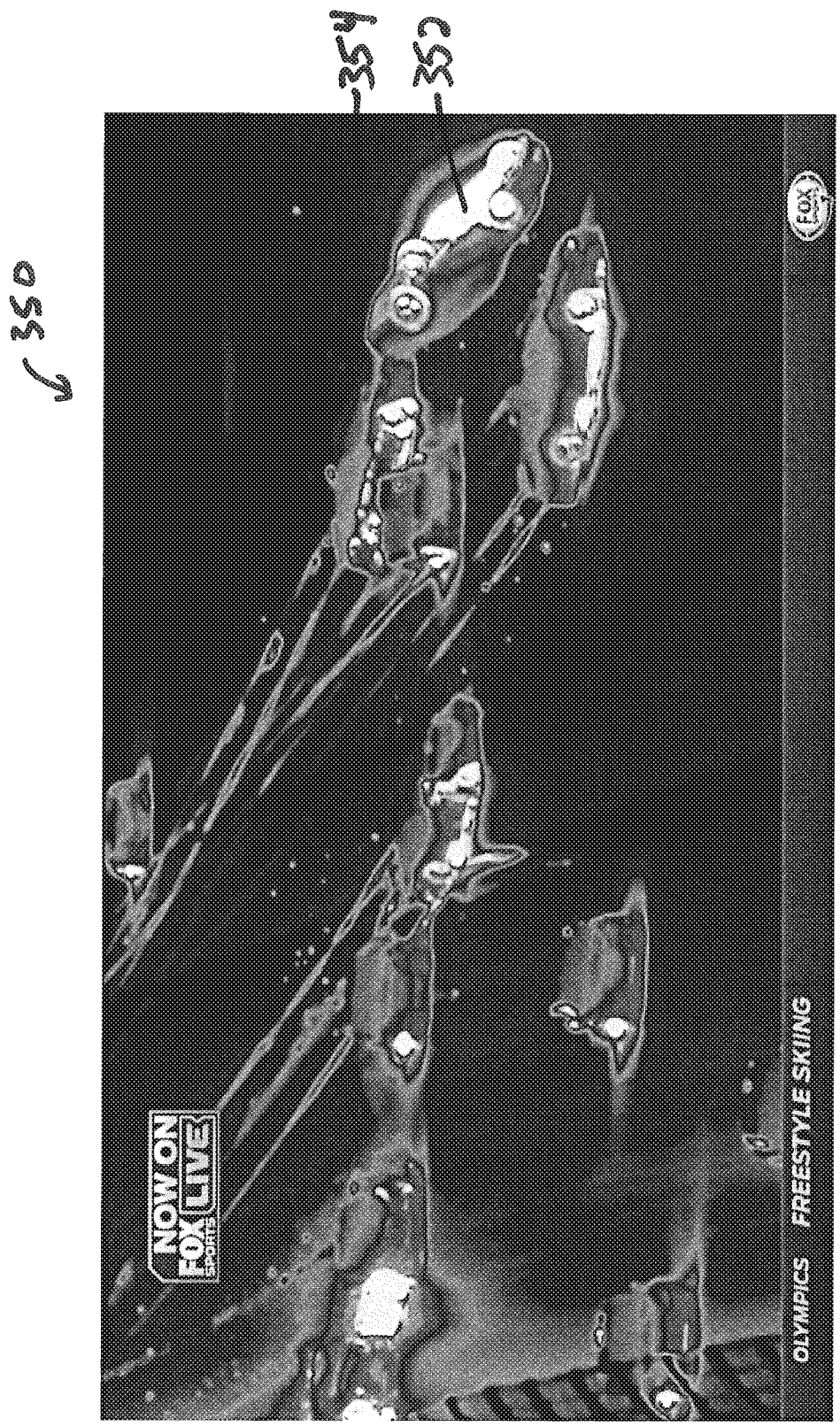
FIG. 44 illustrates exemplary thermographic effects relative to a freestyle skiing event.

With respect to thermography, FIG. 44 illustrates generally at 350 thermographic effects relative to a freestyle skiing event. As can be seen, varying levels of heat signatures in the image may be seen, for example at hot portion 352 and relatively colder portion 354.

Figure 30:
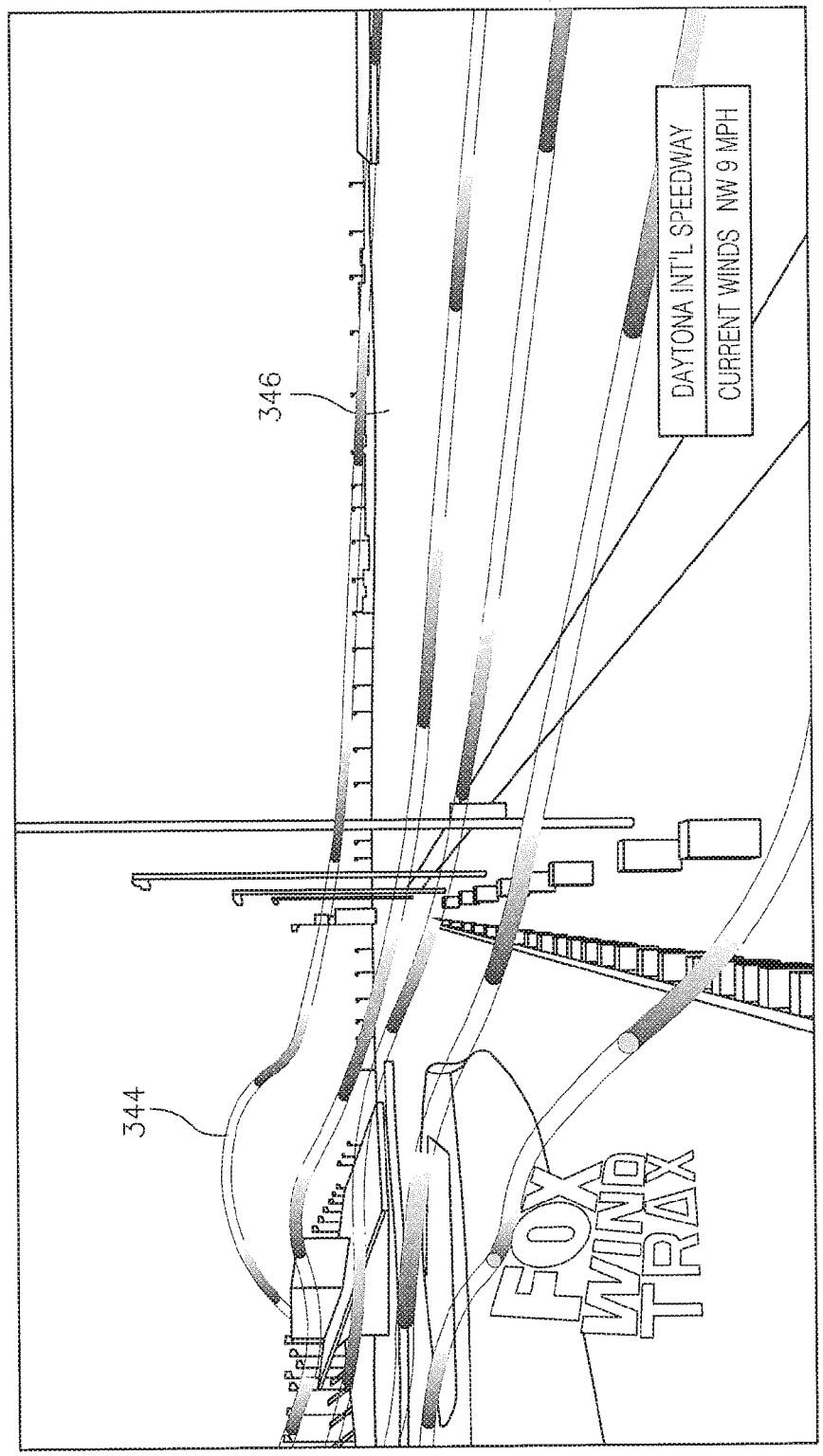
FIG. 30 illustrates another exemplary racing screenshot with wind overlays.
Figure 31:
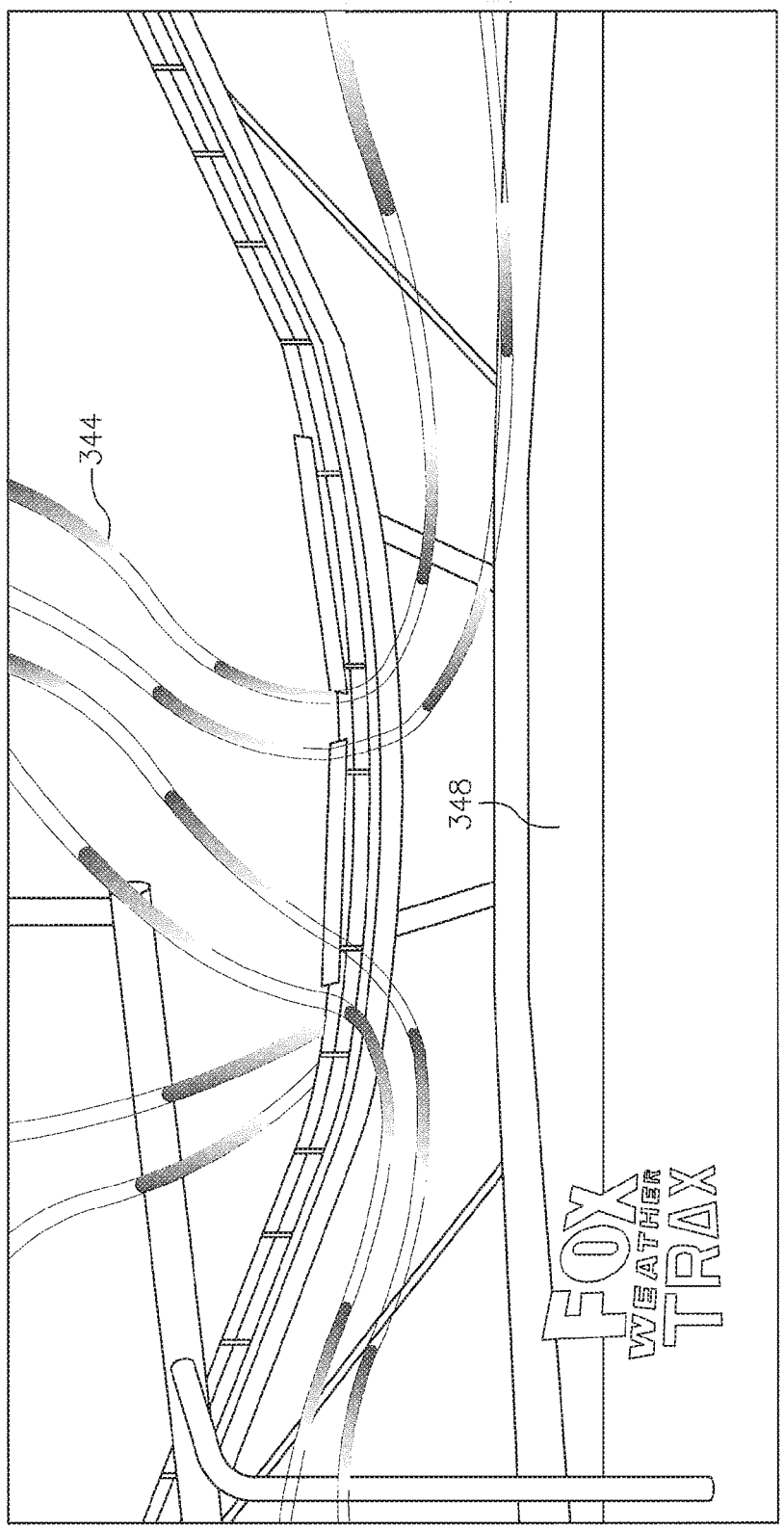
FIG. 31 illustrates an exemplary football screenshot with wind overlays.

Additionally, multiple sampling points may be integrated into the analysis, or an image may be analyzed relative to ground or atmospheric effects of wind (or other environmental conditions), e.g., dust, heat waves and its motion relative to waves, etc. FIG. 30 illustrates wind effects 344 not just over the track 346, but also over surrounding structures and tracks. FIG. 31 illustrates wind effects 344 relative to a football field 348.

Additionally, such information can reveal effects on the broadcast itself, or as an overlay on objects within the broadcast, e.g., effects on a race car, effects on a ball in play, etc. With regard to thermography (utilizing cameras or other sensors detecting heat), hot spots or cold spots may be detected and displayed, e.g., indicative of exertion or injury of a player, heat of a vehicle or surface, etc. Such thermography is useful in various broadcasts, e.g., sailing, baseball or cricket (heat indicative of a bat hitting the ball), soccer, football, racing, boxing or UFC. As noted above, thermographic, IR, etc. cameras may be used alongside broadcast cameras to detect heat.

Exemplary embodiments also provide for improved edit software, including, without limitation: "fly" between cameras, virtual camera angles, stop motion action, enhanced telestration and visual analysis, etc. The present disclosure may also be used for pre-produced packages, live-in-studio, and large scale events.

As we have noted, in exemplary embodiments, terrain, golf holes, etc. may be tracked and tagged. Further, tracking may include references tied to or associated with particular courses and course portions. Additionally, we have noted that overlay information may be generated from specific animators, operators, coaches, players, etc.

In exemplary embodiments, an expert's input (e.g., a golf professional) is provided as a graphical overlay on a golf course indicating desirable and/or undesirable portions of terrain (e.g., portions of a fairway, green, etc.). For example, such a golf professional may identify on a given golf course hole good and/or bad spots to land a ball from a tee shot, taking into account objective and optionally subjective factors (including e.g., places that might leave a golfer in an adverse position in considering a following shot). In exemplary embodiments, "good" and "bad" places could be shown as a graphical overlay, e.g., with green and red zones, respectively.

Figure 40:
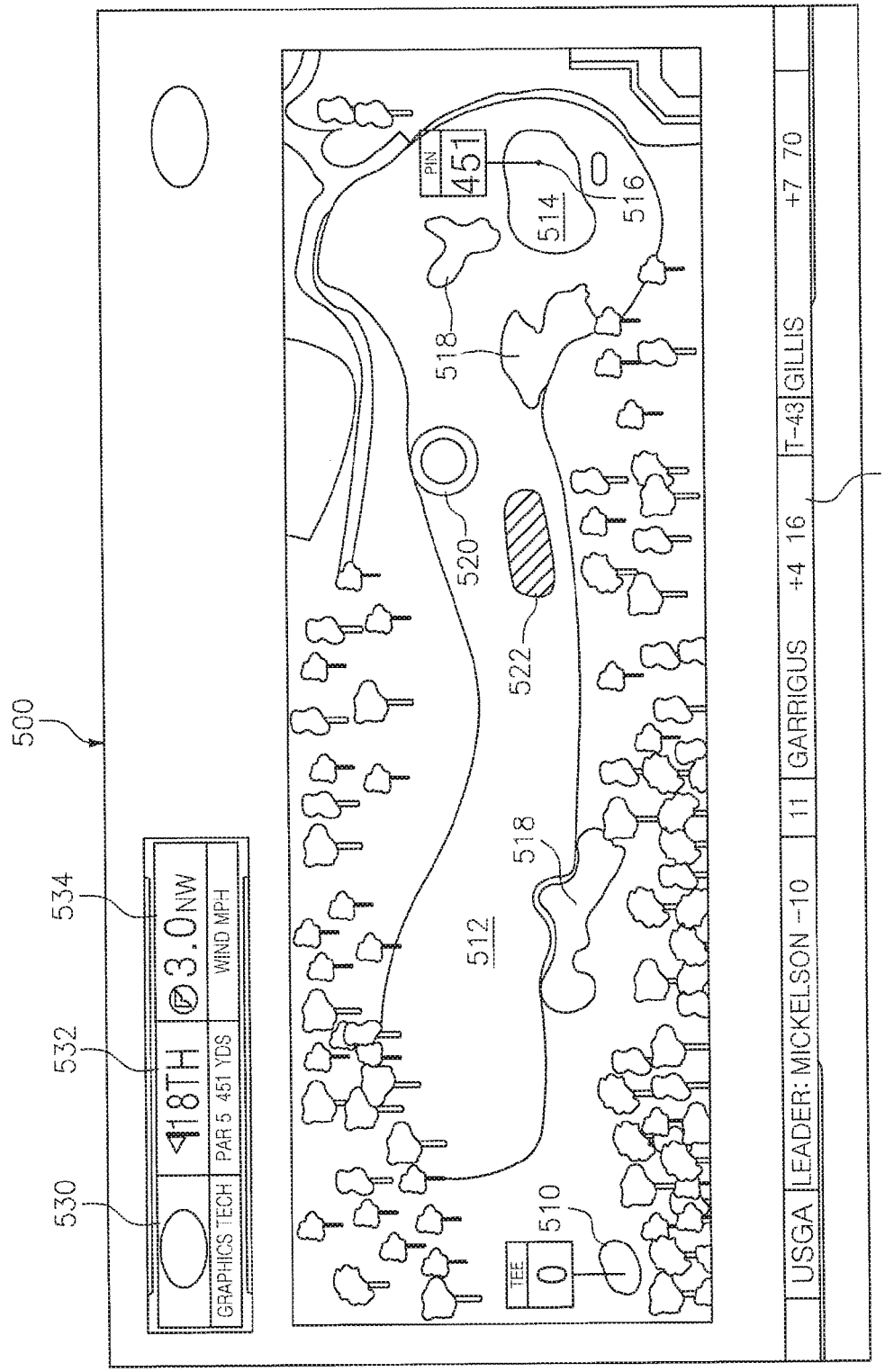
FIG. 40 illustrates an exemplary broadcast frame with plural lie zones indicated thereon.

For example, FIG. 40 illustrates an exemplary golf hole broadcast image, shown generally at 500, showing exemplary aspects of a golf hole, for example, a tee-off area 510, a fairway 512, a green 514 with a pin 516 and various bunkers 518. FIG. 40 also illustrates various exemplary banner information, for example the station identifier banner 530, the hole identifier banner 532, the wind condition banner 534 and the player board banner 536. In relevant part, this exemplary embodiment illustrates at least one, and in this case two, zones according to desirable lies.

In FIG. 40, a first zone 520 illustrates (for example in green) a desirable lie from a tee shot. As is illustrated any illustrated zone may also designate levels of desirability, in this exemplary case, shown as concentric circles, with inner circles being more desirable. However, other representations of more or less desirable lies within any given zone may be utilized, for example and without limitation non-uniform concentric shapes, alpha-numerical designators, target indicators, etc.

Referring again to FIG. 40, a second zone 522 illustrates (for example in red) a non-desirable lie, in this case utilizing hash lines across an entire shape. However, as above, various levels of desirability may also be illustrated within any given zone. Further, these zones may adjust or shift, in real time or periodically, according to players or conditions, e.g., as wind effects change during play.

Figure 41:
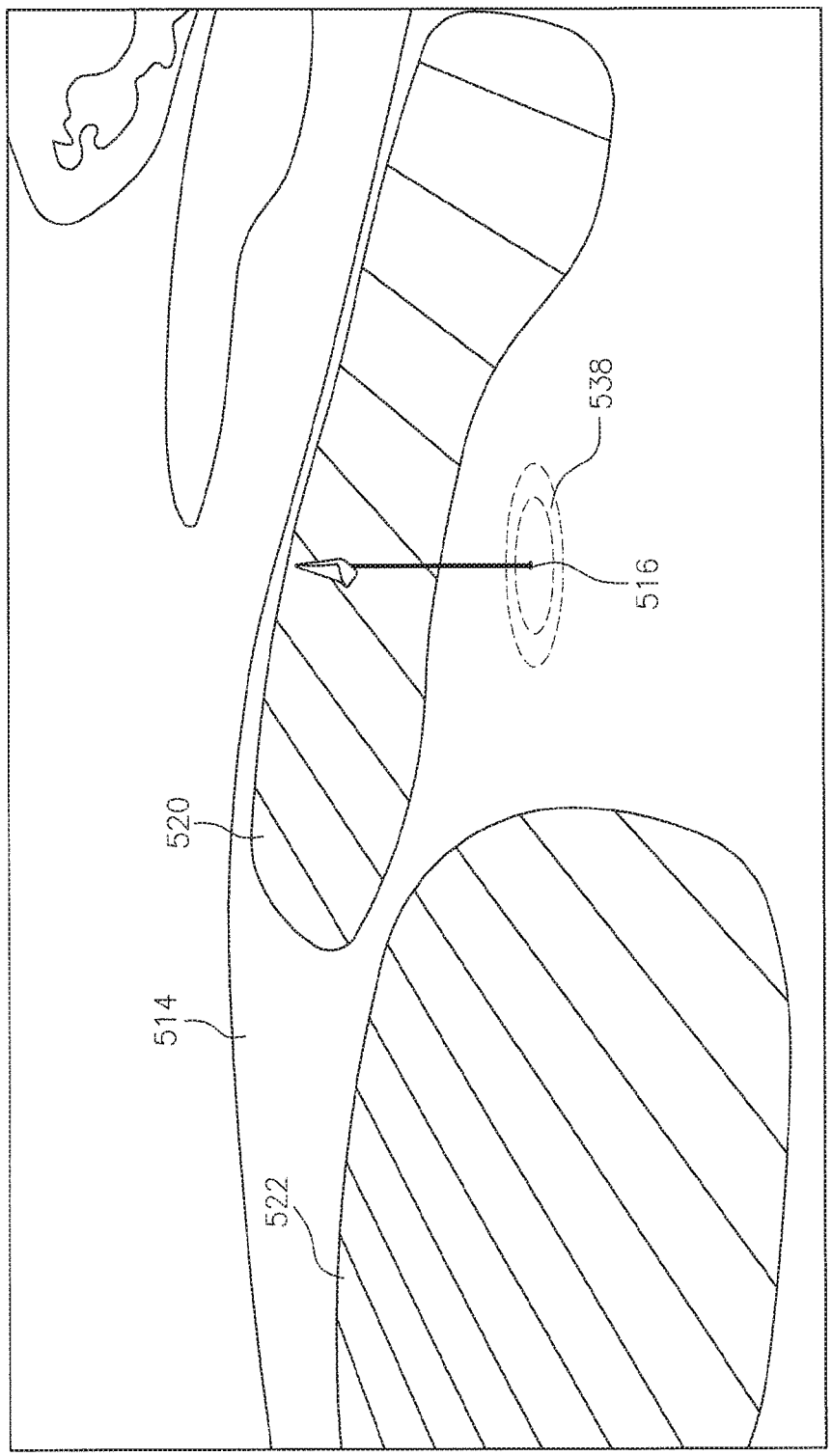
FIG. 41 illustrates an exemplary green with hole highlighting as well as indications of desirable or less desirable zones.
Figure 42:
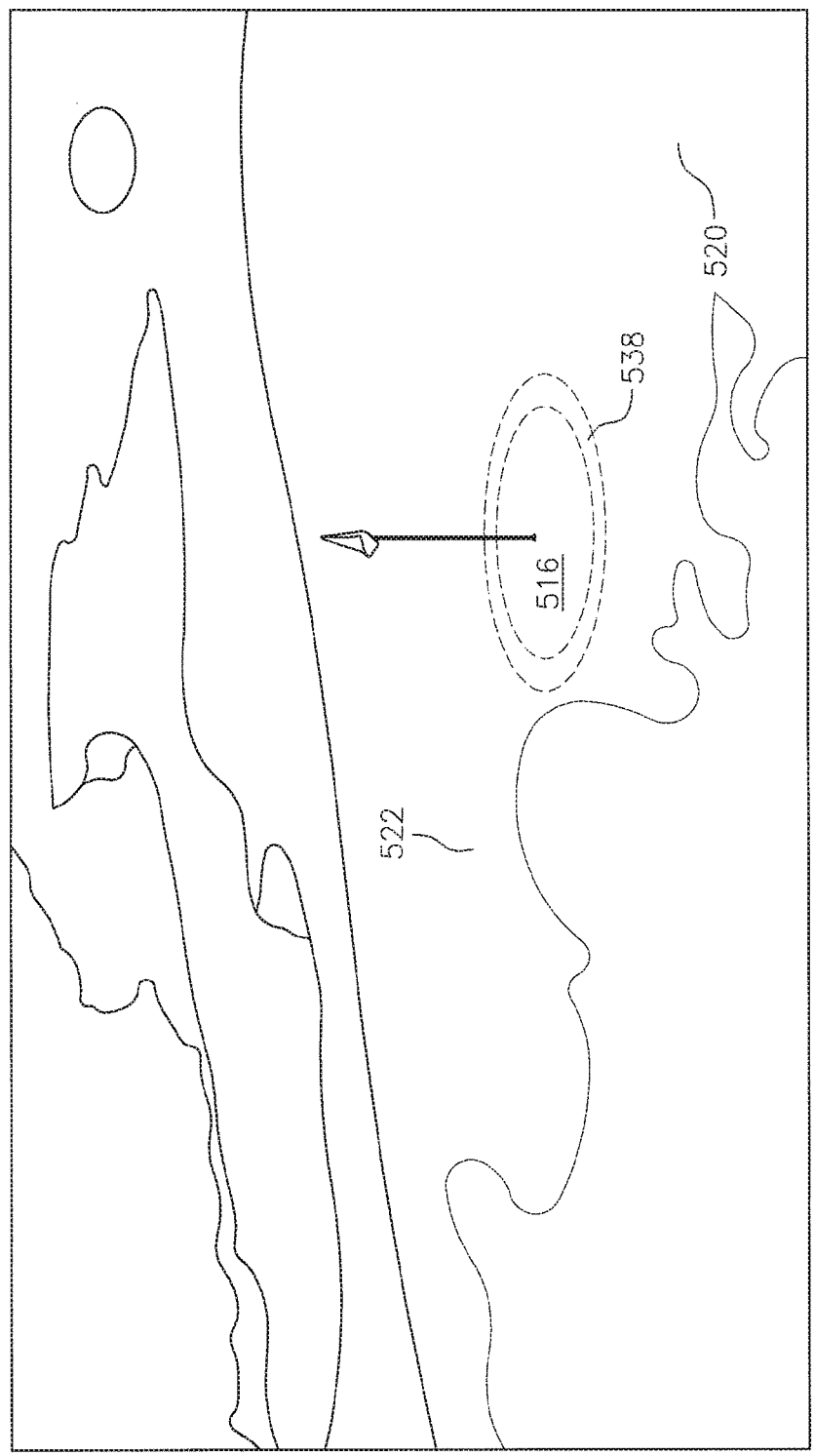
FIG. 42 illustrates another exemplary green with hole highlighting as well as indications of desirable or less desirable zones.

FIG. 41 illustrates an exemplary green 514, with a pin 516 and pin highlight indicator 538 with a first 520 and second 522 zone indicated thereon. This FIGURE also underscores the teachings herein that multiple aspects described herein may be combined, in this case, hole highlighting and zone indication. FIG. 42 illustrates another exemplary combination, with hole highlighting (in this case with variable density shading, along with zone indication.

Figure 43:
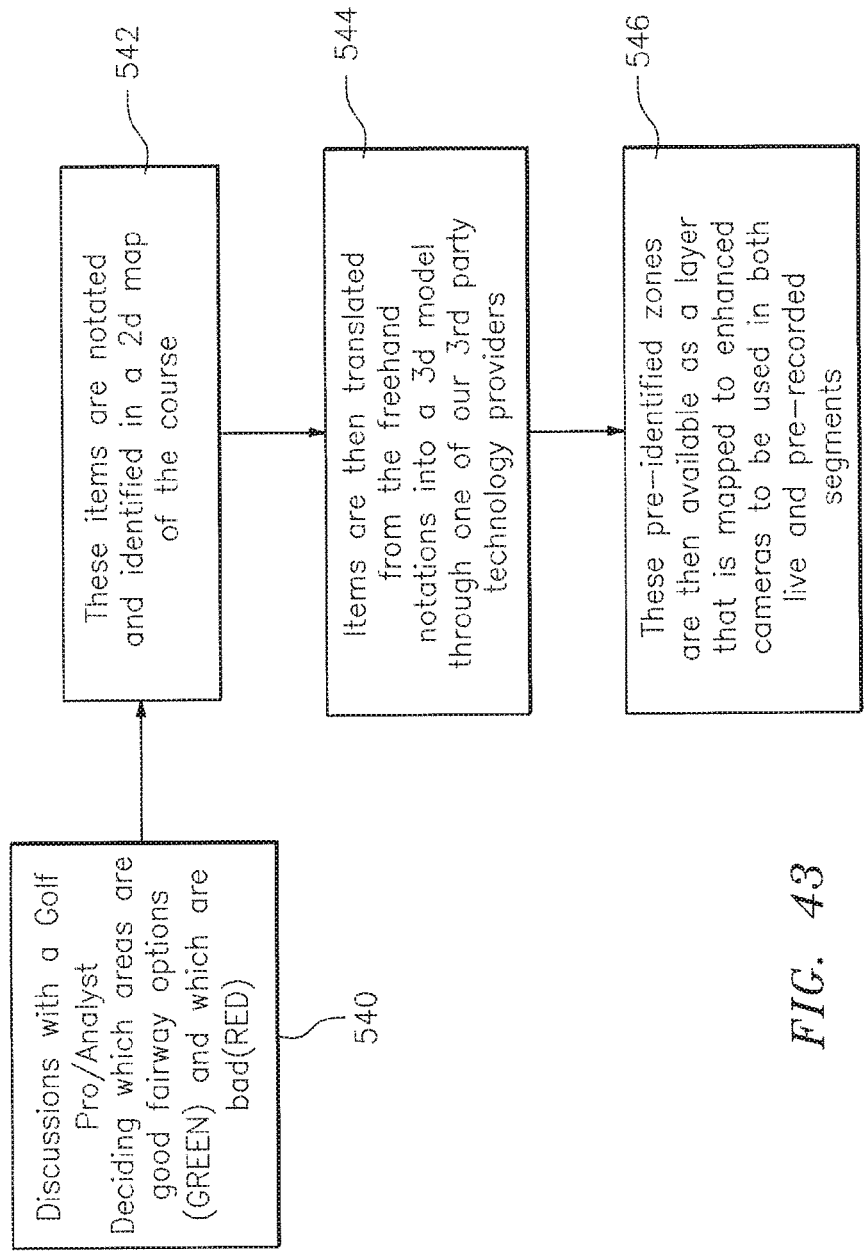
FIG. 43 illustrates an exemplary flow chart for implementing overlays indicative of more or less desirable zones.

FIG. 43 illustrates an exemplary flowchart, with input by an expert, analyst, etc., notation and/or overlay on a map, in general. FIG. 43 further indicates a more specific contemplated embodiment, including: at box 540, discussions with a golf pro/analyst wherein such decides which areas are good fairway options (for a good zone, e.g., green) and which are bad (for a less desirable zone, e.g., red); at box 542, notations and identification of such information in a two-dimensional map of the course; at box 544, translation of such (e.g., freehand notations) into a three-dimensional model, possibly pulled from a third party technology provider, among other sources; and at box 546, providing such pre-identified zones as a layer that is mapped to enhanced cameras for availability with live and pre-recorded segments.

The above also indicates that representations, maps, etc. of any golf course, hole, green, etc., may be acquired in any number of ways or pulled from any number of sources. In one exemplary embodiment, a golf professional would look over the mapped terrain and assign such "good" and "bad" places (e.g., on a hole by hole basis, among others). These assigned places could be any size or shape, as desired, in order to take into account varying factors such as length of the preceding shot, anticipated conditions of the terrain, time of day, lighting, wind conditions, physical capabilities of players, contestant skill sets, etc. Further, these places may be updated based upon change to any factors, such as condition of the terrain, characteristics of any given player, environmental conditions, unanticipated hazards, etc.

In exemplary embodiments, indications of such places may be entered by the professional using a user interface, e.g., a tablet or other mobile device, or by another editor or operator. In exemplary embodiments, a user inputs such data on a 3D rendering of a course from a course map. Further exemplary embodiments, provide a 3D rendering of a course from specific pre-determined camera shots (from the vantage points of those cameras), with the information overlaid relative thereto.

Figure 32:
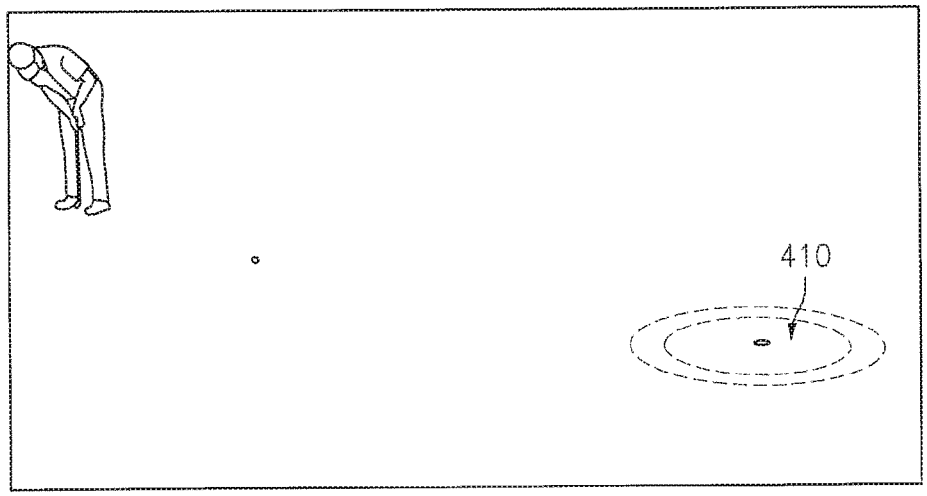
FIG. 32 illustrates an exemplary golf hole highlighting effect.

FIG. 32 illustrates another exemplary overly as a golf hole highlighting effect 410. This exemplary embodiment provides augmented reality for highlighting of a golf hole, with graphics on a green. Advantageously, such embodiments provide direction for a viewer for golf holes that are sometimes difficult to see on a green once the pin has been removed. In other exemplary embodiments, such highlighting is performed automatically via control software that measures relative shading on a green to determine whether such highlighting is advantageous (e.g., by exceeding some difference threshold in shading or other property).

Figure 33:
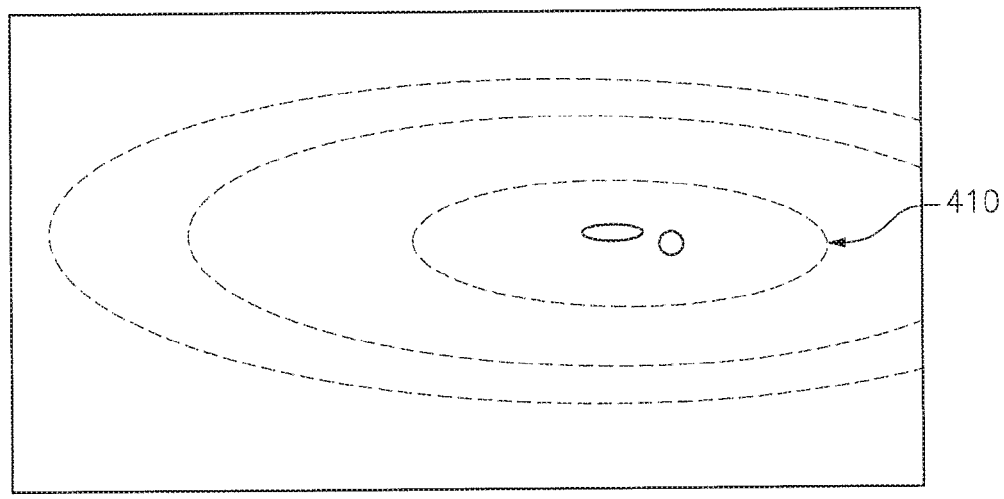
FIG. 33 illustrates the exemplary highlighting effect of FIG. 32 just prior to sinking of a putt.
Figure 34:
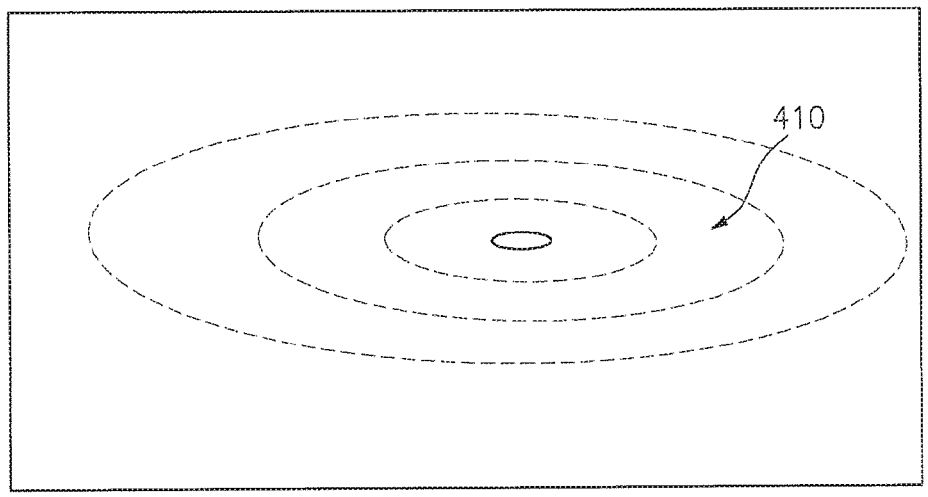
FIG. 34 illustrates the exemplary highlighting effect of FIG. 33 after sinking of a putt with collapse of the highlight.

FIG. 33 illustrates the exemplary highlighting effect of FIG. 32 just prior to sinking of a putt, with a close-up of the hole and highlight. FIG. 34 illustrates the exemplary highlighting effect of FIG. 33 after sinking of a putt with an exemplary collapse of the highlight, emphasizing sinking of the putt.

In other exemplary embodiments, a lidar scan of a golf course is utilized to provide data (in exemplary embodiments, exact data) for topography, distance, scale, etc. Such data may be incorporated with camera calibration and/or pixel tracking data, with mapping of graphics to the course, including hole highlights, yard markers, player identifiers, etc. Other exemplary embodiments provide for insertion of three dimensional objects, such as virtual leaderboards, advertisements, etc.

With regard to the above example describing highlighting of a golf hole, using lidar or otherwise, or any examples presented herein, such methods and systems are also applicable to other broadcasts where highlighting of an object might be desirable, including without limitation, tennis, baseball, football, skiing, etc.

Figure 35:
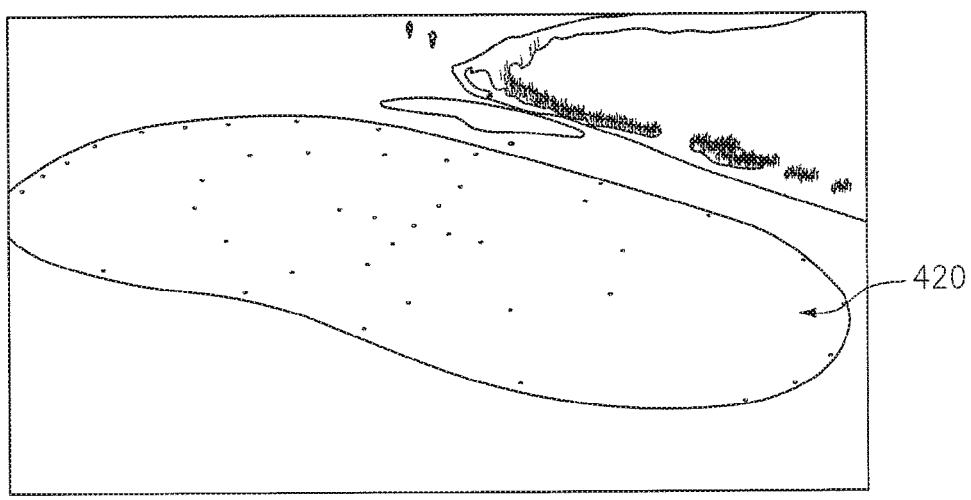
FIG. 35 illustrates an exemplary mapped green.
Figure 36:
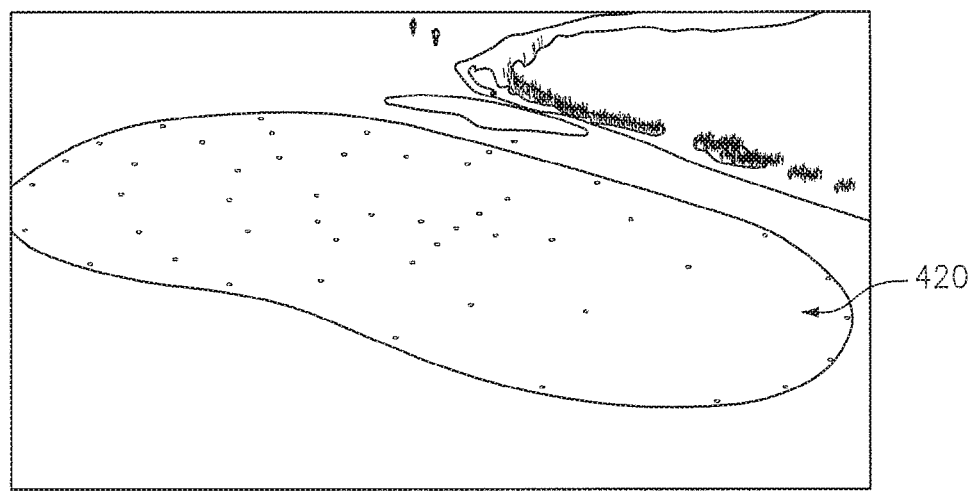
FIG. 36 illustrates the green of FIG. 35 without substantial shading.
Figure 37:
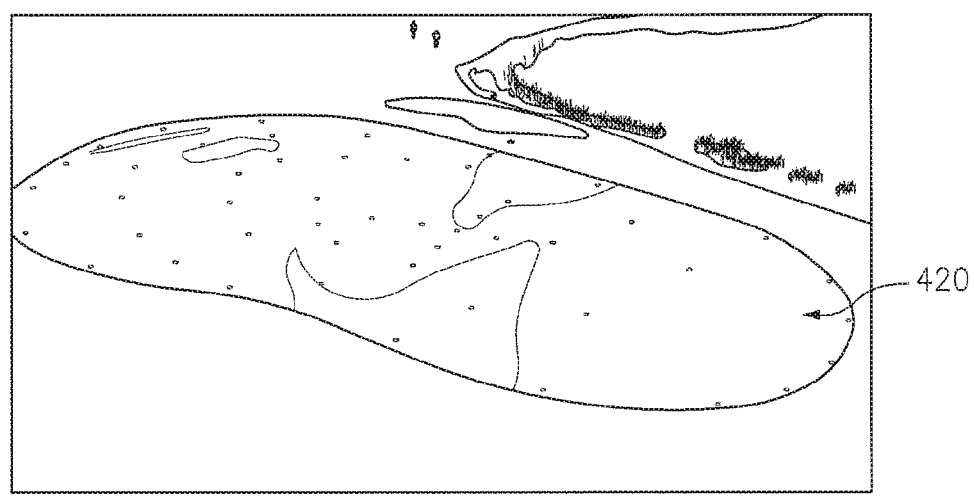
FIG. 37 illustrates the green of FIG. 36 with partial shading.
Figure 38:
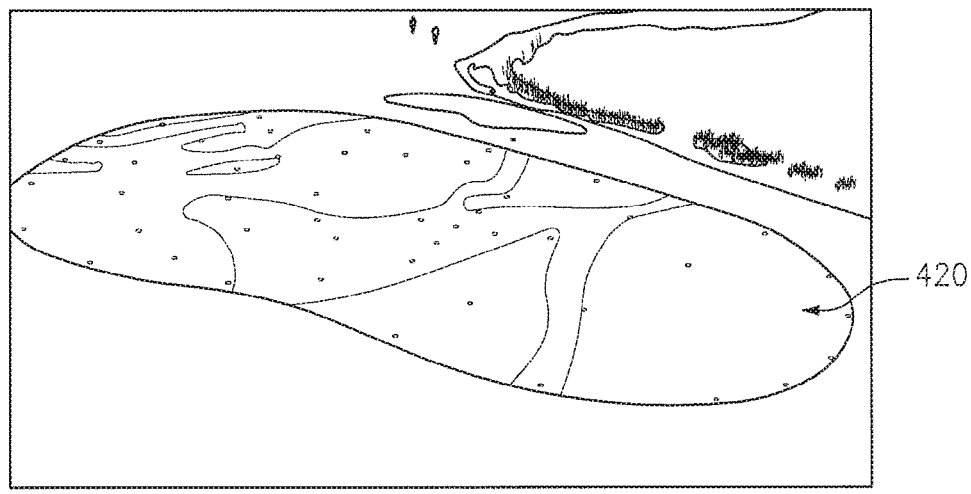
FIG. 38 illustrates the green of FIG. 37 with additional shading.
Figure 39:
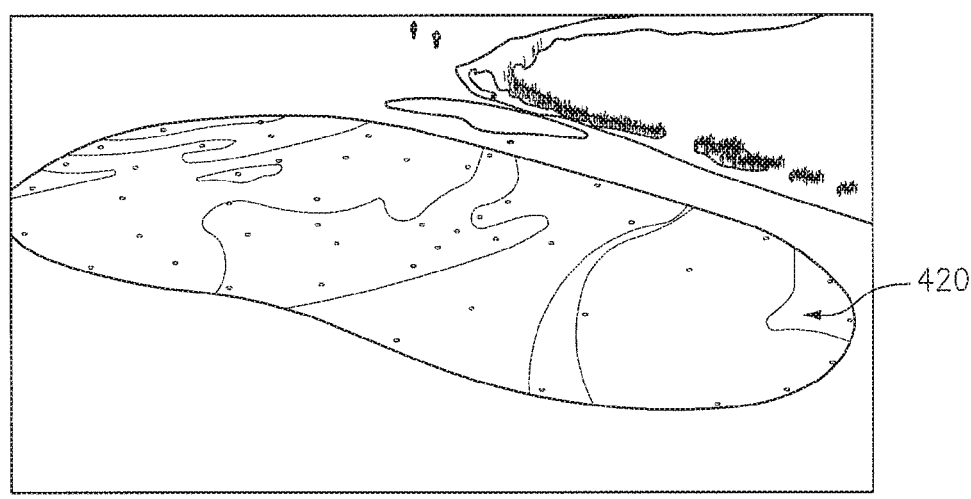
FIG. 39 illustrates the green of FIG. 38 with additional shading.

Referring now to FIG. 35, another exemplary embodiment provides an exemplary mapped green 420, which as further FIGURES will illustrate, provides a graphical enhancement of a green by displaying shadows to emphasize the topography of a green. This exemplary embodiment seeks to dramatically show the undulations of a green by displaying a graphic that appears as shadows cast at an angle (mapping of the green via the white dots is not necessary). FIG. 36 illustrates the green of FIG. 35 without substantial shading. FIG. 37 illustrates the green of FIG. 36 with partial shading. FIG. 38 illustrates the green of FIG. 37 with additional shading. FIG. 39 illustrates the green of FIG. 38 with additional shading.

As above, such mechanisms may employ manually or automatically. If automatically, a system may determine that a level of shading would be desirable, e.g., by comparing levels of shading or color on a green surface.

Also, as above, a lidar scan of a golf course may be utilized to provide such data for a green. Matching a three dimensional model of the course from the lidar scan and marrying it to the live video, the system can control the relative intensity of the gradation effect, as well as direction of the virtual light source on the green.

With regard to the above example describing acquiring topography of a golf course, using lidar or otherwise, or any examples presented herein, such methods and systems are also applicable to other broadcasts where highlighting of an object might be desirable, including without limitation, tennis, baseball, football, skiing, etc.

User Interfaces

Further, it should not be ignored that various implementations, including those described below, may use touchscreens as interfacing for controlling any of the various described functions.

Figure 12:
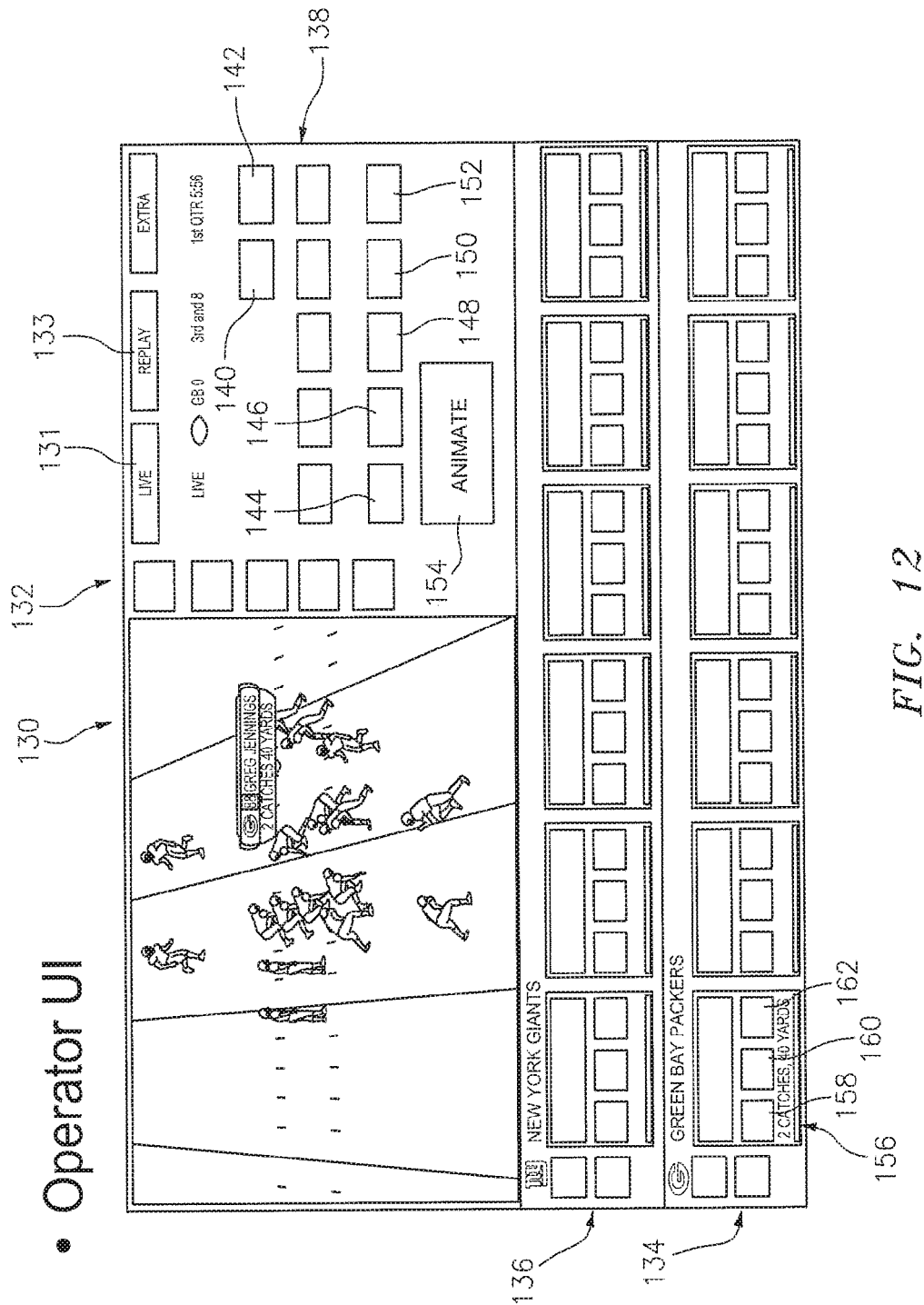
FIG. 12 is an illustration of an exemplary operator's user interface.

FIG. 12 illustrates an exemplary user interface (UI), shown generally at 130, which enables selective view 131, capture, replay 133, etc. of various cameras, shown generally as selections 132, on an event. As can be seen from the figure, this exemplary embodiment is tracking ten players (offense 134 vs. defense 136), and allows for one or more selections via an operator. In exemplary embodiments, one or more monitors may be provided to the operator in order to further facilitate tracking of plural athletes. Also, as can be seen from the figure, the UI contemplates favorites 138, auto 140 and manual 142 modes, highlight 144, swap 146, audio 148, disk 150 and extra 152 modes, as well as animate commands 154. With reference to the tracked players, but without limitation, this particular embodiment facilitates player (one or more) selection of statistics, shown generally at 156, game 158, season 160 or text 162 related.

Figure 13:
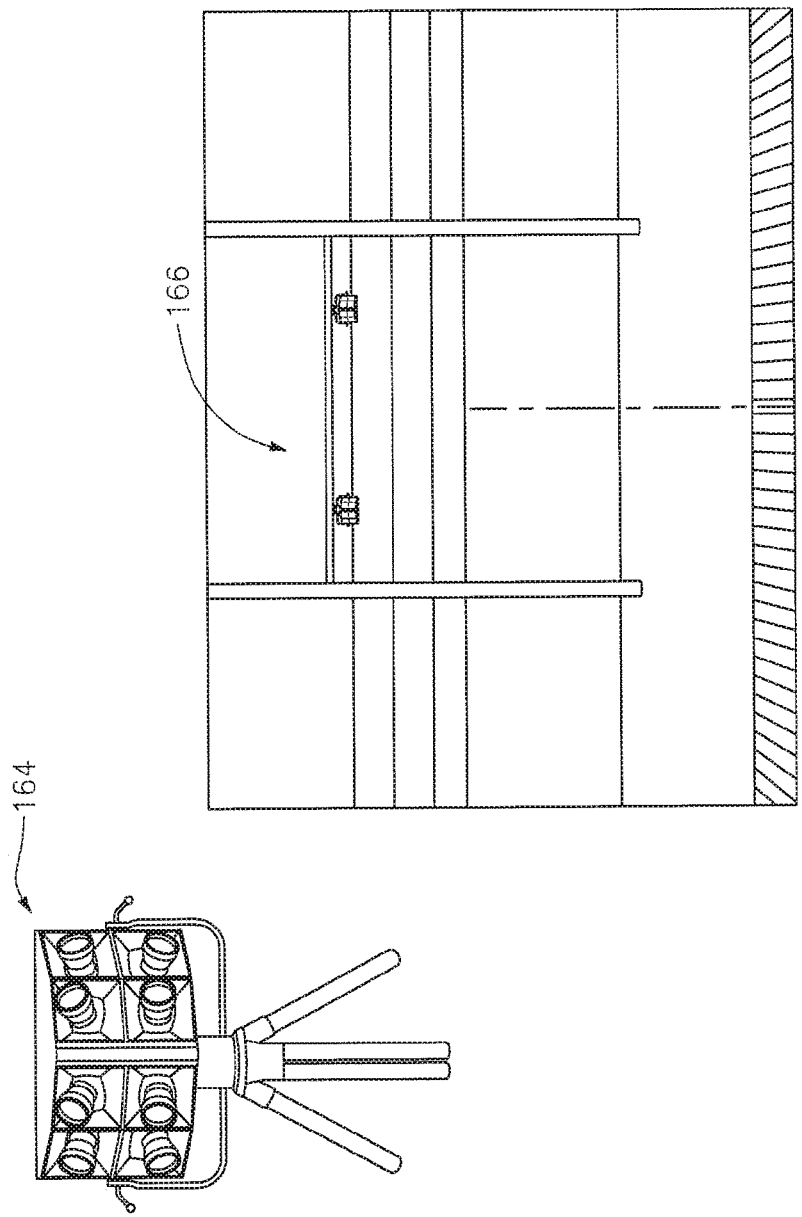
FIG. 13 is an illustration of an exemplary camera and setup.
Figure 14:
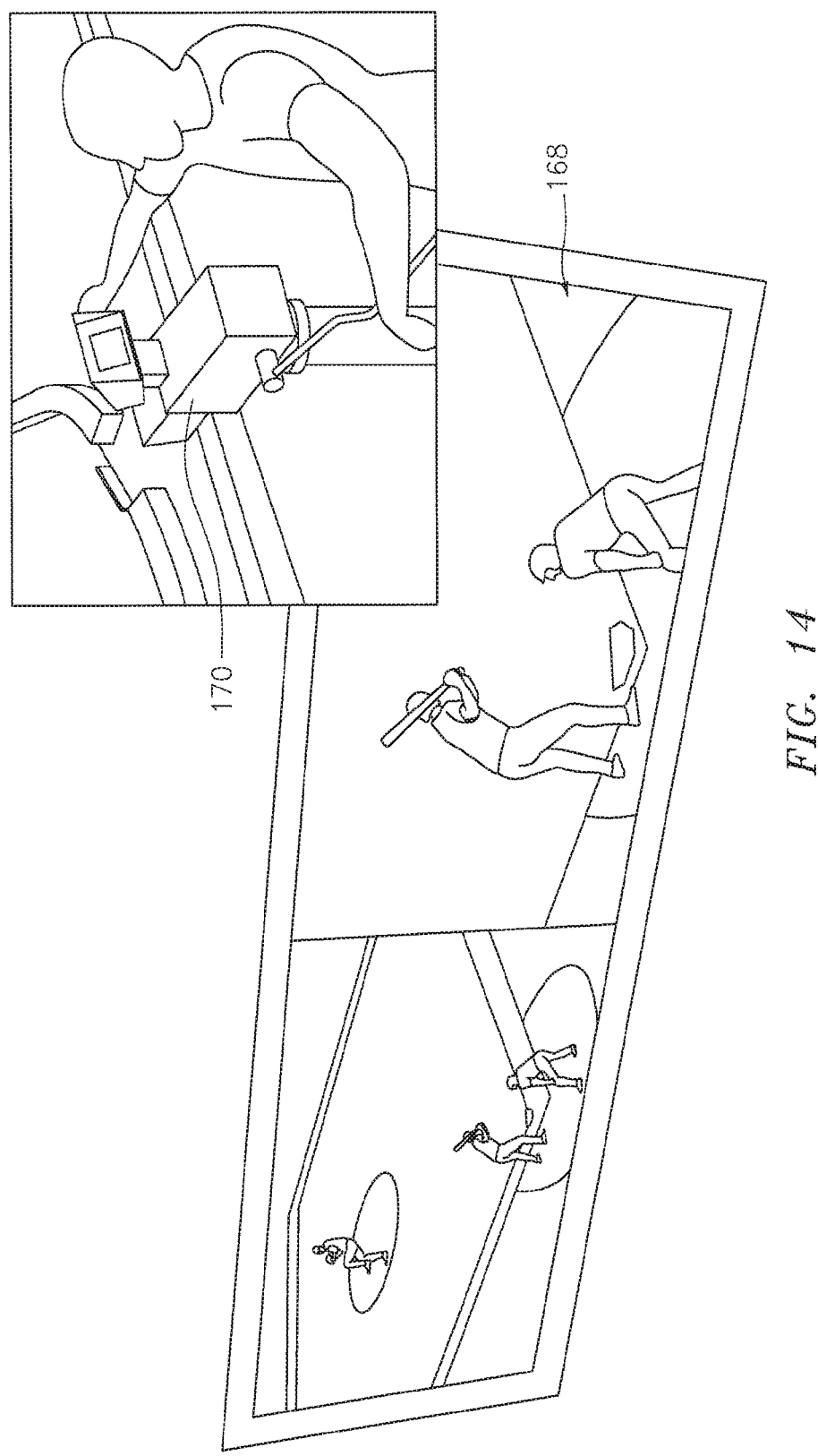
FIG. 14 is an illustration of an exemplary camera and image capture.

FIG. 13 illustrates an exemplary camera setup, showing a camera array generally at 164, as well as a camera hang setup (e.g., 21 feet on the field center line), shown generally at 166, for football. FIG. 14 shows captured image 168 from cameras 170.

Figure 15:
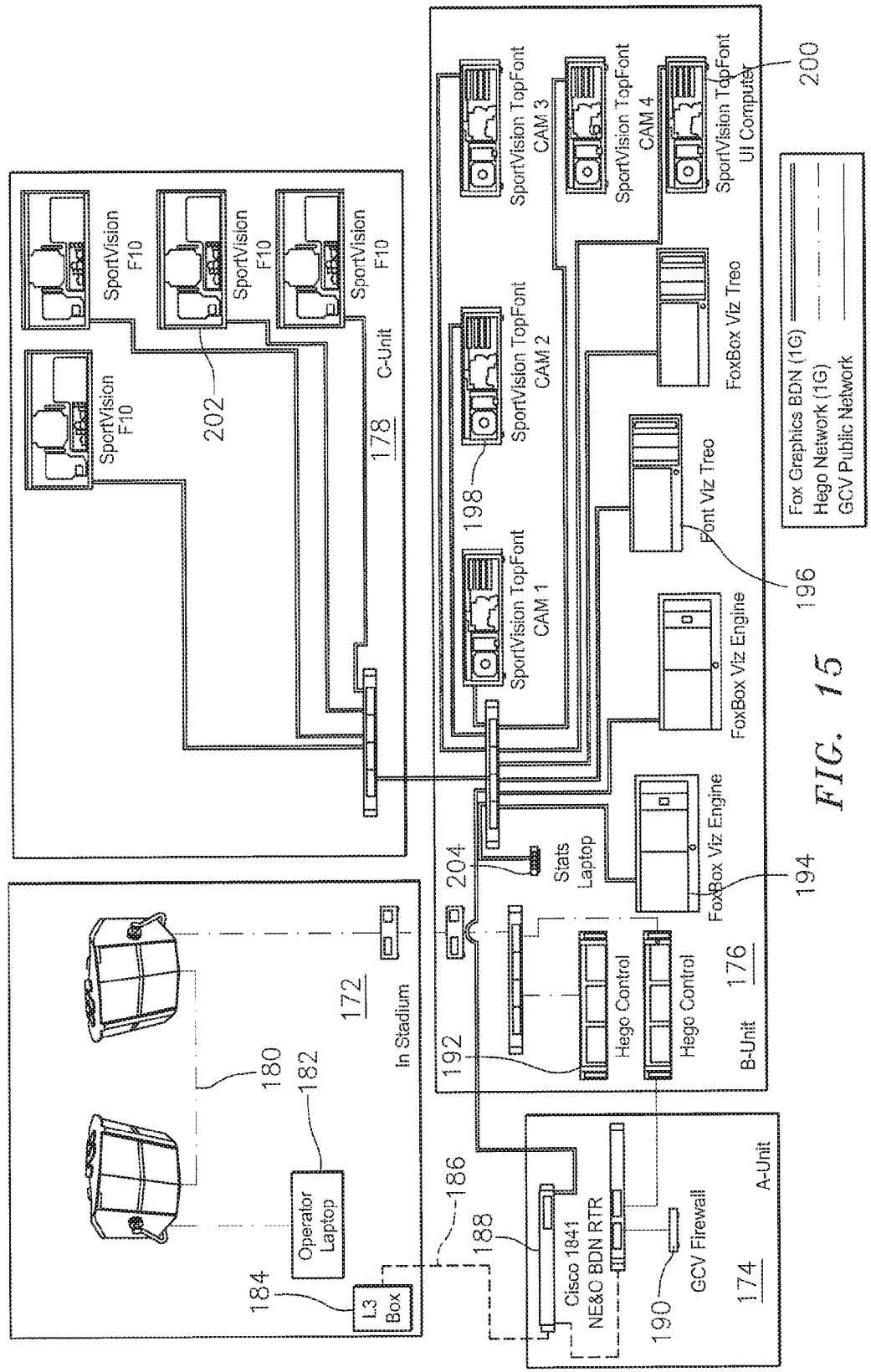
FIG. 15 is an exemplary system plan in accordance with embodiments of the present disclosure.
Figure 16:
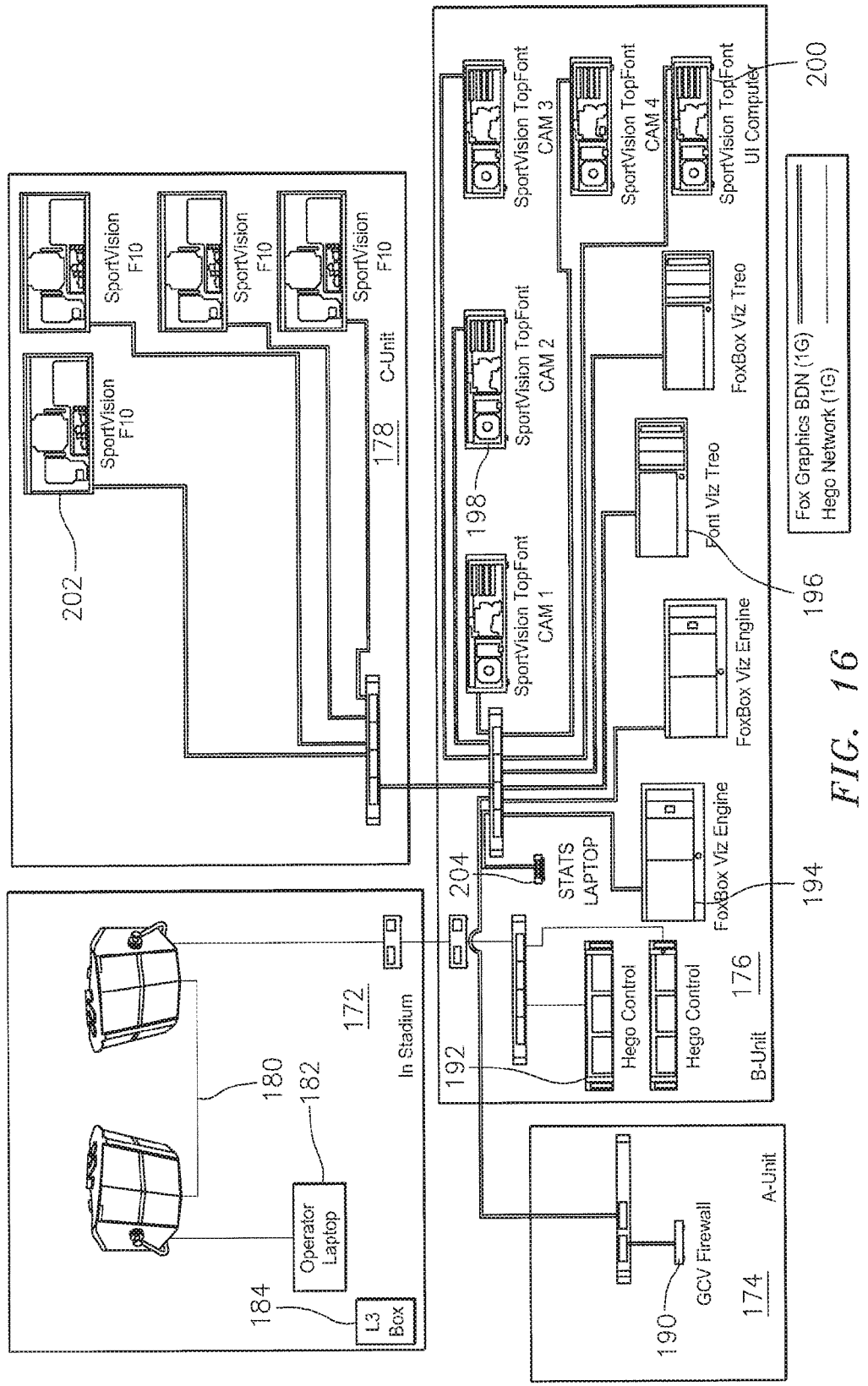
FIG. 16 is another exemplary system plan in accordance with embodiments of the present disclosure.

FIGS. 15-18 illustrate an exemplary control setup for such a system, including in-stadium components 172, A-Unit components 174, B-Unit components 176 and C-Unit components 178. FIGS. 15 and 16 illustrate camera arrays 180 and an operator laptop 182 and connection 186 via an L3 Box 184 to a router 188 and firewall 190 in the A-Unit.

B-Unit includes control engines 192, Viz engines 194, Viz Treos 196 and top font cam processing systems 198 alongside a UI computer 200. C-Unit shows SportVision systems 202. A stats laptop 204 is also illustrated in the B-Unit.

Figure 17:
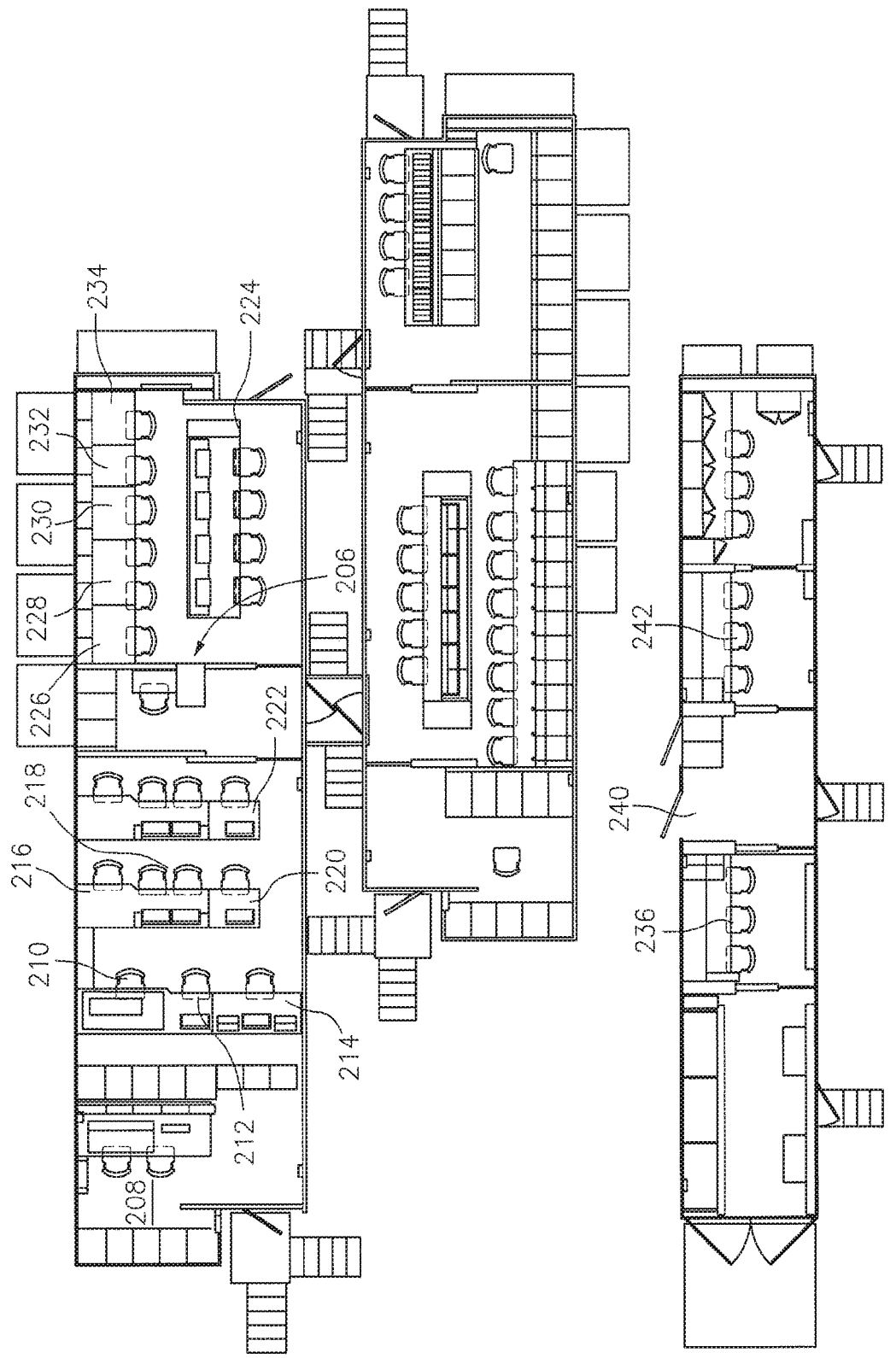
FIG. 17 is an exemplary workstation layout in accordance with embodiments of the present disclosure.
Figure 18:
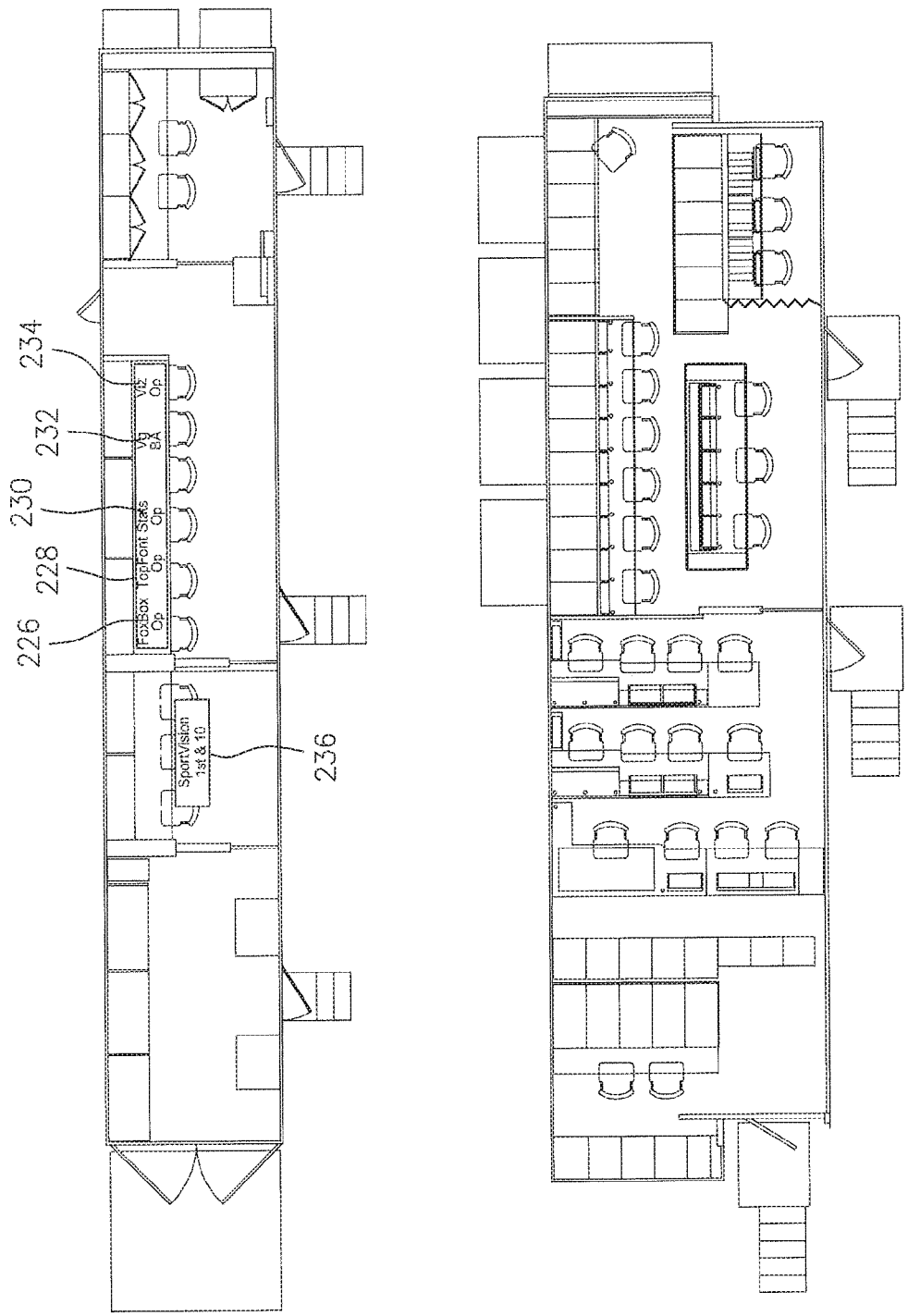
FIG. 18 is another exemplary workstation layout in accordance with embodiments of the present disclosure.

FIG. 17 shows the graphics racks 206 surrounded by various studio stations, including audio submix 208, TD 210, Director 212, Producer 214, 8 Second Guy 216, AD 218, Exec 220, Tech manager 222, stats 224, FoxBox Op 226, Topfont operator 228, Stats Op 230, Viz BA 232, Viz Op 234, along with SportVision 1&10 236 in an edit room 238, a 4K operator 240 and a Game Edit 242.

In an exemplary embodiment, Network Connectivity vs. Systems Closed Network include Cat5 to camera, Fiber to Camera or Fiber to truck, with an unobstructed view of field, a monitor showing previews of all renders, a program monitor, and a PL station with Iso to TopFont Operator (e.g., with a 2 Channel beltpack or a KP Panel). Two or more single mode fibers may be used for the monitoring feed, potentially a $3^{rd}$ to put on a RVON KP panel.

In exemplary embodiments, optical tracking tracks moving objects on a field of play. This includes any type of tracking, be it image recognition, motion sensitive indication of possible tracking, etc.

An exemplary system is proposed below as Example 1:

Example 1 Scope

This procedure applies to \ "A" Crew, but could be applied in general to any originated broadcast for which TracAB is desired.

This will apply to the operations on site. It is assumed that all the under the hood workings between affiliates are working.

Example 1 Roles

TracAB Operator—Primarily responsible for performing field alignment of TracAB cameras and tagging players during the event. Communicates with TopFont Operator with regards to the status of the objects currently being tracked. Located in the stadium in a location that allows for an unobstructed view of the field. Works with department with regards to obtaining available fiber in the building. Works with Sports Audio department with regards to setting up Intercom at operating position. Troubleshoot TracAB system as needed. Relays to Tech Manager any issues with setup or operation of equipment in a timely fashion.

TopFont Operator—Primarily responsible for inserting TopFonts during broadcast using company provided touchscreen interface. Communicates with Producer, Director, Stats, Graphics BA in identifying what graphics are needed when. Also works with Tape Room for enhancements on replays. Communicates with TracAB Operator regarding key players that need to be tagged for each series. Troubleshoot TopFont system as needed. Relays any issues with setup or operation of equipment to Tech Manager in a timely fashion.

First and 10 Operator—Builds provided tripods and panheads for 4 camera locations. Calibrates those panheads and cameras for use for both the First and 10 system and the TopFont System. Verifies connectivity to the TopFont System. Operates First and 10 system during game. Troubleshoots First and 10 system, Pan, Tilt, Zoom data as needed. Relays any issues with setup or operation of equipment to Tech Manager, Technical Director and EIC in a timely fashion.

EVS Operators—Verify that all machines are setup to record and playback RP-188 Timecode properly. Performs test with Technical Director and TopFont Operator on set day to verify. Relays any issues with operation of Equipment to Tech Manager and EIC in a timely fashion.

Mobile Unit Engineers—Works to integrate systems into the broadcast both from a video standpoint and a networking standpoint. Verify all signals are present and acceptable. Assist TracAB Operator, TopFont Operator, First and 10 Operator with troubleshooting as able.

Example 1 Definitions and Acronyms

TracAB—Optical tracking system consisting of 2 camera arrays, a processing computer and a tracking computer. In this instance, it will be used to provide positioning information of objects (players) in a 3D space for the use of inserting informational graphics. These devices will be networked together using gigabit Ethernet switches on their own closed network. The processing computer will be connected via a second NIC to the graphics network.

TopFont—TopFonts to be delivered as a composited HD-SDI version of one of 4 cameras through 4 separate renderers. The system consists of a User Interface computer with a touch screen and 4 rendering computers. Each of these 5 computers will be networked together using gigabit Ethernet switches to the graphics network.

First and 10—The system which currently inserts the down and distance ("yellow line").

Media Converter—An optical-electrical converter. In this case, it is used for the purpose of converting Ethernet to fiber in the stadium, and then fiber back to Ethernet at the truck location.

BDN—Fox's Broadcast Data Network used as the graphics network on the NFL Games.

Fiber Optic Cable—In this document any Fiber optic cable will be referring to single mode fiber unless otherwise specified.

GBE Switch—A managed switch capable of transmissions of 1 gbps between ports.

Example 1 Procedural Steps

Example 1 Initial Integration

Identify space for 4 RU of processing computers. Install Processing computers in racks. Install GBE switch for closed network. Connect NIC 1 from each processing computer to the GBE Switch for closed network. Set IP Address information on NIC 2 of systems provided processing computers using IP information for the graphics network.

HD-SDI input and output need to be connected to each renderer and made available in production switcher and routing switcher. Preview output of each TopFont Render will be provided by a scan-converted output. This needs to be made available in the routing switcher.

First and 10 System is installed as normal. The First and 10 system is not included in the 20 RU count.

Set IP address information on each of the provided computers (rendering engines, user interface computers) using IP information for the graphics network. (Hopefully the IP Address information can be provided before the machines ship, but this may not be the case).

Connect each of the provided computers to the gigabit Ethernet switch that contains the graphics network. Connect Top Font Operator User Interface position. Turn on all computers and verify network connectivity between all devices in the truck.

Example 1 Weekly TracAB Setup

TracAB mounting locations are verified with stadium personnel and Tech Manager. TracAB cameras unloaded out of C-Unit and transported into Stadium. TracAB camera arrays are mounted.

Take Reference picture from alongside each TracAB camera array. Power is needed at each TracAB array. Ethernet Cable is used to connect from one TracAB array to the other.

If the distance is too great for GBE signals to pass, or it is not physically possible to run a CAT-5 Cable between the cameras, a set of GBE Capable media converters may be used between the cameras. One TracAB array is connected to the closed Hego Systems network in the truck via a Gigabit capable media converter. The other TracAB array is connected to the TracAB operators laptop by Ethernet cable. If the distance is too great for GBE signals to pass, or it is not physically possible to run a CAT-5 Cable between the camera and the operating position, a set of GBE Capable media converters may be used between the camera and the operating position or the truck and the operating position.

TracAB Operator sets up operating position consisting of video monitor, laptop computer and intercom. TracAB Operator calibrates arrays and verifies everything with regards to the TracAB system is functioning properly. TracAB Operator reports to Tech Manager when system is fully operational.

An exemplary user Interface (UI) that may be used to tag the players is described immediately below:

Exemplary cameras track the players and send the information to a computer. An operator on the computer either: manually tags the players; views an automatic tag; or confirms an automatic tag. This data is passed onto a computer where an operator can now render the appropriate graphic to air.

Optical tracking tracks moving objects on a field of play, which can be a relatively manual process of assigning the proper player to the right moving object. However, additional exemplary embodiments may work as follows:

Exemplary processes and workflow allow tagging of players quickly. This can include moving the physical tagging process to the truck, instead of at stands or by the cameras. The present disclosure also suggests various strategies to tag players using game cameras, e.g., routing appropriate game cameras to the operator for more efficient tagging.

The present disclosure also describes a wholly different way to track players, such as a method of having the graphics operator be able to tag players from his user interface, by potentially using his touchscreen.

The present disclosure also contemplates a reverse tagging method, to relate a player on the screen on the field and ask the tagging computer which player is closest to the place on the field which was touched on the other computer. It may then tag the appropriate player with the object that is closest on the field.

Further, this technology may be used for advantage with greater than HD technology, particularly in area of interest highlight. For example, the greater than HD technology described herein may be utilized in combination with player tracking, etc. Exemplary embodiments also contemplate, in addition to that described below, a preset and controlled extraction window that pans, scans and/or zooms utilizing tracking data (i.e., controlling an extraction window utilizing tracking data).

An exemplary process is so:
Start with full raster greater than HD video, e.g., 4k video.
A graphical box or cursor, representing the area to which we are interested may appear.
The view then zooms to fill the box.

Exemplary embodiments of greater than HD systems and methods follow: a first image or video is captured at a first resolution, which resolution is greater than high definition and higher than a predetermined broadcast display resolution. A desired portion of the first image or video is then displayed at a second, lower resolution, which resolution is less than and closer to the predetermined broadcast display resolution. Accordingly, a selected portion of the captured image may be displayed at or near the predetermined broadcast display resolution (i.e., minimizing or eliminating loss of image detail relative to the predetermined broadcast display resolution).

Figure 19:
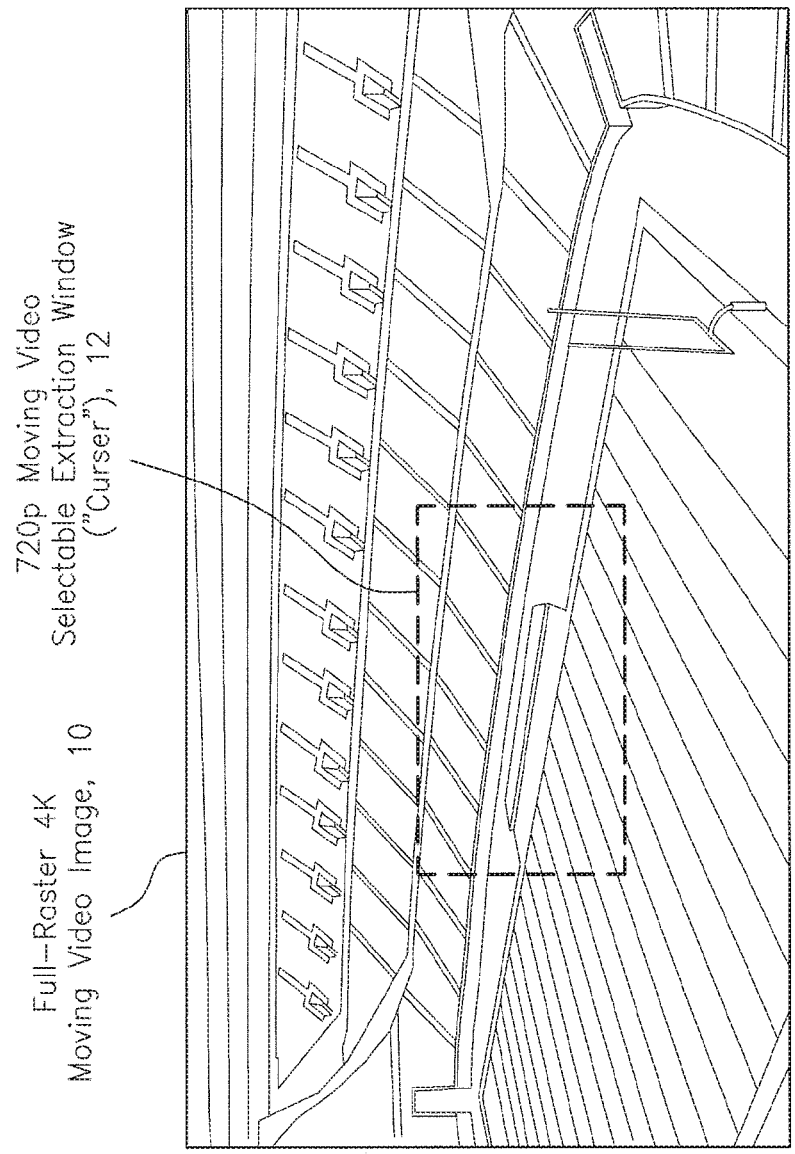
FIG. 19 is an exemplary graphical user interface of a 4K captured image with a 720p selectable extraction window.
Figure 20:
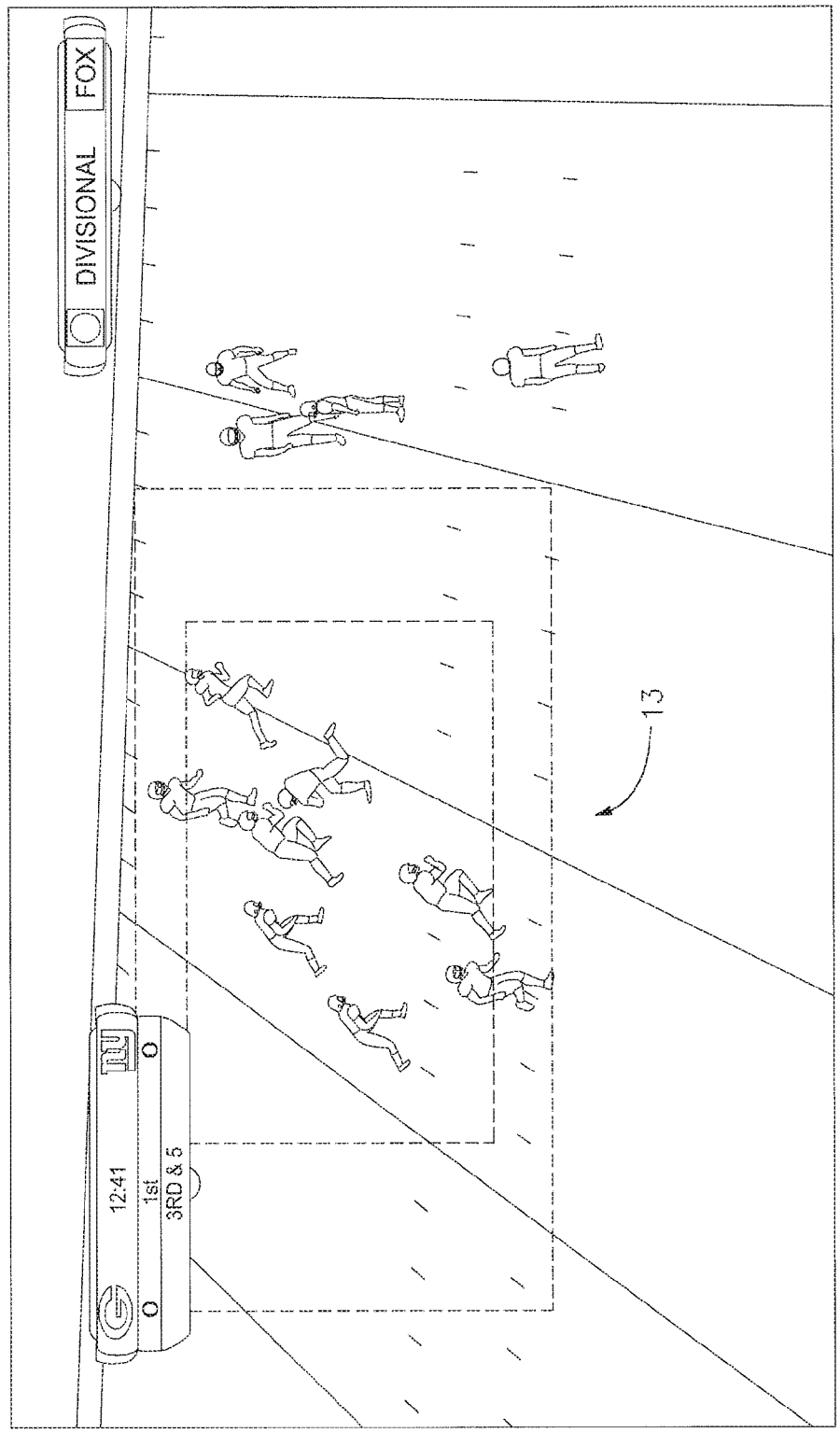
FIG. 20 illustrates an exemplary embodiment showing relative extractions.

An example of this is illustrated at FIG. 19, which shows a screenshot of a full-raster 4K moving video image 10. A portion of the 4K image, illustrated as a 720p moving video selectable extraction window 12, is then selected for presentation. Thus, native image capture occurs at a greater than high definition resolution, and portions of that greater than high definition image are selected for presentation via the 720p extraction window. While, FIG. 17 specifically illustrates 4K capture and a 720p extraction window, it should be recognized that both or either of the captured image and extraction window may be provided at or sized to other resolutions. FIG. 20 shows a similar view of relative extractions, provided generally at 13.

Also, while one extraction window is illustrated in FIG. 19, the present disclosure contemplates simultaneous multiple extraction windows that may be applied to the same captured image.

In further exemplary embodiments, the selectable extraction window (12 in FIG. 19) is provided at a graphical user interface ("GUI") (14 in FIGS. 21 and 22) that is configured to allow an operator to navigate within a captured image and select portions of the captured image for presentation. In exemplary embodiments, the extraction window is configured to allow the operator to adjust the size and position of the extraction window. In other exemplary embodiments, the extraction window is configured to track or scan across moving images, e.g., to follow a play or subject of interest during a sporting event. In other exemplary embodiments, plural operators may extract from the same images via the same or via plural GUIs.

Figure 21:
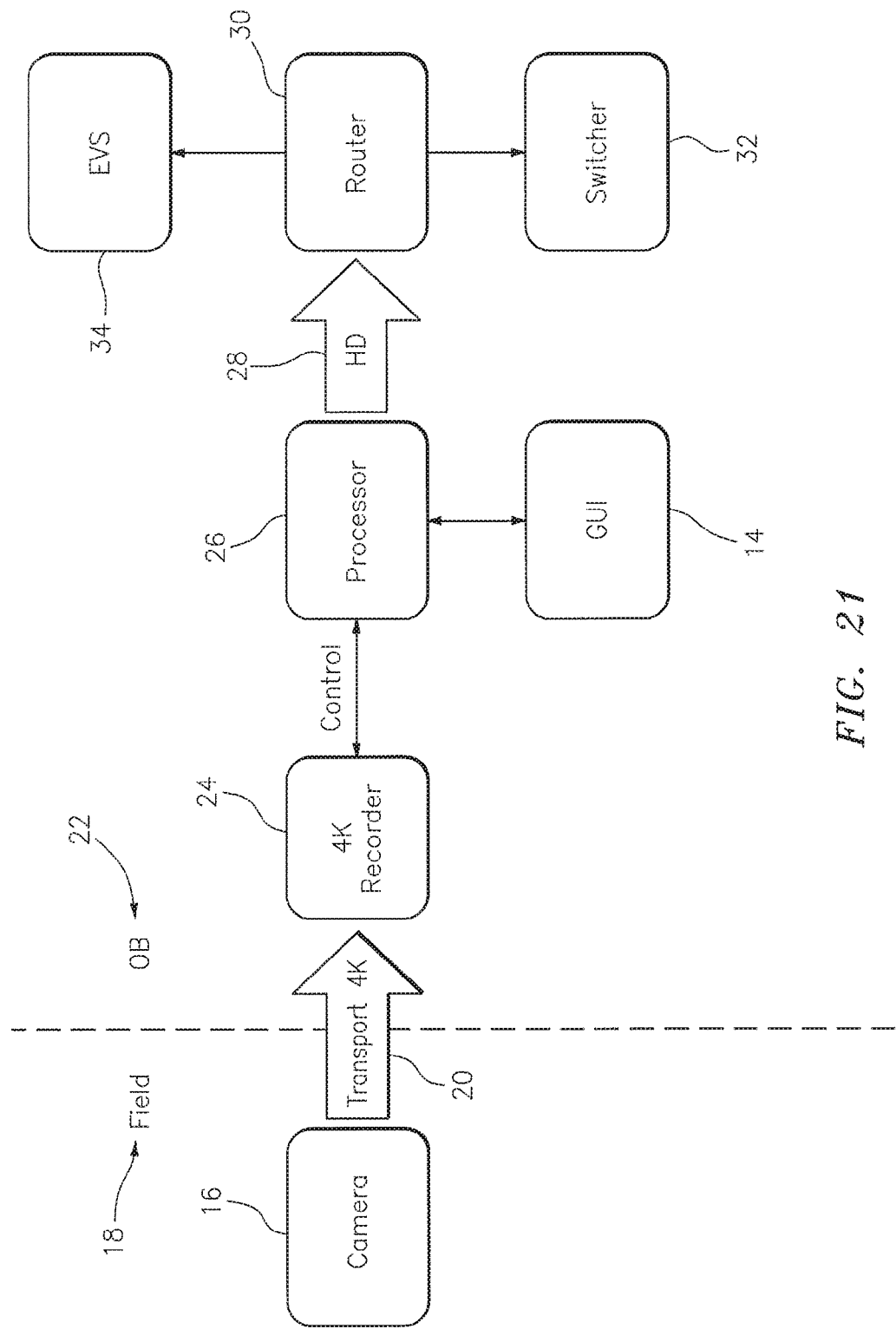
FIG. 21 is an exemplary first system for capturing and transporting a 4K image to an offsite processor and graphical user interface.
Figure 22:
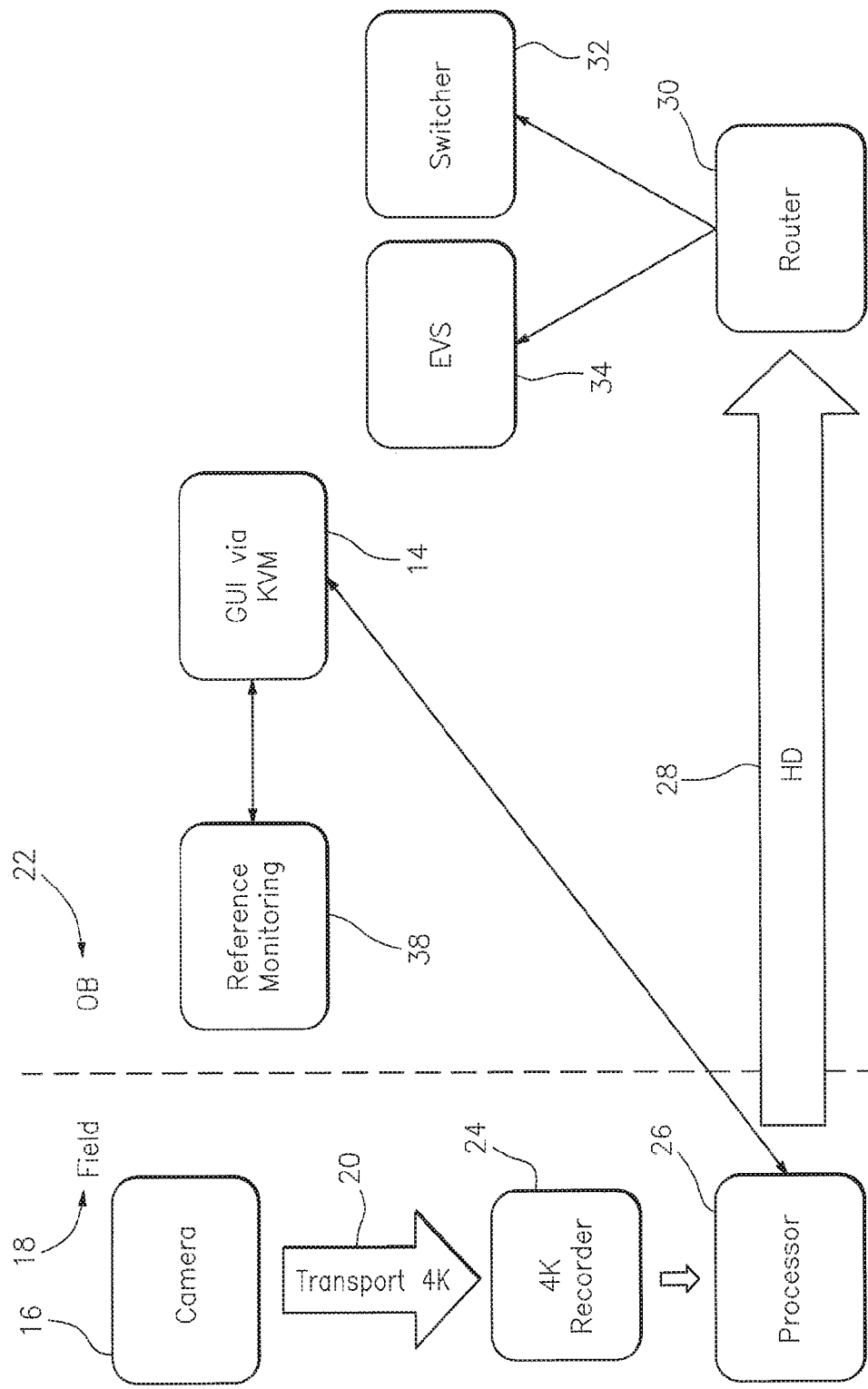
FIG. 22 is an exemplary second system for capturing and processing a 4K image onsite, followed by transport of a high definition image offsite.

Referring now to FIGS. 21 and 22, processing of the captured images may occur either offsite (FIG. 21) or onsite (FIG. 22). Referring to FIG. 21, an exemplary system is illustrated wherein a camera 16 captures 4K images onsite, e.g., at a field (shown generally at 18) for a sporting event. A transport mechanism 20, e.g. a fiber capable of transporting a full bandwidth 4K video, transports the captured images to an operations base ("OB") (shown generally at 22), e.g., a production truck away from the field 18.

An image recorder 24 records the captured images, e.g., as a data stream on a server, and is configured to allow an operator to go back in time relative to the recording and examine selected portions of the captured image as described above. Such control is provided to an operator via the GUI 14 through a processor 26 interfacing with the GUI 14 and recorder 24. In exemplary embodiments, the recorder, processor and GUI are configured to allow the operator to go back instantaneously or near-instantaneously to select portions of the recorded image for presentation.

For example, with regard to FIG. 21, an operator in a truck would use a GUI to navigate the full raster 4K image and maneuver the selective 16:9 extraction window, in a manner similar to a cursor, to select an area of interest. In exemplary embodiments, the GUI is configured such that the extraction window may select an area of interest in one or both of live and recorded video. Also, as has been noted above, the present disclosure contemplates sizing and zooming capabilities for the extraction window. In other exemplary embodiments, the system is configured to mark keyframes and establish mapping for desired moves, e.g., pans and zooms, among others, around the image.

Referring again to FIG. 22, in exemplary embodiments, the output 28 of the system (e.g., a 720p/59.94 output relative to a 4K capture) is provided to a router 30 that allows the output to be taken live to a switcher 32 or to be ingested at a server 34 ("EVS") for later playout. Also, in exemplary embodiments, a resulting image can be slowed down for replay or rendered as a still image, if desired, either at the server 34 or at the operator's position (via processor 26).

FIG. 22 provides an alternate exemplary embodiment, wherein capture, transport and recording of the native image (in this example 4K images) occurs onsite, e.g., at the field 18 of a sporting event). An onsite processor 26 provides or interfaces with an operator GUI 14 in an operations base 22 (e.g., a truck, though the GUI could be accessed from any convenient location) and provides a reference video 38 of the image to allow the operator to navigate the image via the extraction window. The output 28 is then transported from the field to an offsite router 30.

In another embodiment, at least one GUI is accessed by a tablet controller as a navigation tool for the system. Such tablet controller may be wireless and portable to allow for flexible a primary or supplemental navigation tool.

In other exemplary embodiments, multiple cameras may be positioned to capture images from different points of view, and extraction windows may be provided relative to the multiple image captures in a system for selectively displaying portions of native images from different points of view.

Further exemplary embodiments provide real time or near real time tracking of subjects of interest (e.g., identified, selected or pre-tagged players of interest or automatic tracking of a ball in a game). Additional exemplary embodiments also provide virtual directing of operated and automatically tracked subjects of interest for cutting into a full live broadcast, utilizing backend software and tracking technology to provide a virtual viewfinder that operates in manners similar to otherwise human camera operators. Such processes may also use artificial technology for simple tracking, e.g., of a single identified object, or for more complex operations approximating motions utilized by human camera operators, e.g., pan, tilt and zoom of the extraction window in a manner similar to human operators. For those examples using 4K (or the like) capture, camera capture could utilize a specifically designed 4K camera. A camera may also use wider lensing to capture more of the subject, with possible reconstituting or flattening in post production. Also, different lensing can be used specific to different applications.

Such processes may use the above-described multiple cameras and/or multiple extraction windows, or may run with specific regard to one camera and/or one extraction window. In such a way, an artificial intelligence can automatically capture, extract and display material for broadcast, utilizing the extraction window(s) as virtual viewfinders.

Additional exemplary embodiments also provide for virtual 3D extraction, e.g. via s single camera at 4K or 8K with a two window output.

In other exemplary embodiments, an increased image capture frame rates relative to a broadcast frame rate along with or in lieu of an increased image capture resolution, as has been discussed above.

In such embodiments, a first video is captured at a first frame rate, which frame rate is higher than a predetermined broadcast frame rate. A desired portion of the first video is then displayed at a second, lower frame rate, which frame rate is less than and closer to the predetermined broadcast frame rate. The desired portion of the first video is captured by an extraction window that extracts frames across the native captured video. In such a way, the extracted video provides smooth and clear video, without edgy or blurred frames. Such captured first video may be at any frame rate that is above the predetermined broadcast frame rate.

In further exemplary embodiments, the first video is captured at a first frame rate that is in super motion or hyper motion. In traditional video, this equates to approximately 180 ("supermotion") frames per second or above ("hypermotion" or "ultramotion") in a progressive frame rate. In exemplary embodiments, hypermotion is recorded in discrete times sufficient to capture a triggered instance of an action of camera subject for playback. In other exemplary embodiments, the present system performs a full time record of a camera in hypermotion, e.g., of sufficient length for replay playback archiving, such as more than fifteen minutes, more than thirty minutes, more than an hour, more than an hour and a half, or more than two hours, among others.

In other exemplary embodiments, raw data from at least one camera is manipulated to adjust the image quality (make it "paintable") to broadcast specifications. In exemplary embodiments, broadcast "handles" may be integrated into the system to affect the raw data in a manner that is more germane to broadcast color temperatures, hues and gamma variables.

The present disclosure thus advantageously provides systems and methods for selective capture of and presentation of native image portions, for broadcast production or other applications. By providing exemplary embodiments using a selectable extraction window through a GUI, an operator has complete control over portions within the native images that the operator desires for presentation. Also, by providing exemplary embodiments with image capture greater than high definition (e.g., 4K), desired portions of the image selected by an operator may be presented at or relatively near high definition quality (i.e., without relative degradation of image quality). Further, by providing exemplary embodiments with image capture frame rates greater than that of a predetermined broadcast frame rate, extracted video therefrom provides smooth and clear video, without edgy or blurred frames. Finally, various exemplary embodiments utilizing enhanced GUI features, such as automatic tracking of subjects of interests, plural GUIs or extraction windows for one or plural (for different points of view) captured images provide advantageous production flexibilities and advantages.

It will be apparent to those skilled in the art that, while exemplary embodiments have been shown and described, various modifications and variations can be made to the invention disclosed herein without departing from the spirit or scope of the invention. Also, the exemplary implementations described above should be read in a non-limiting fashion, both with regard to construction and methodology. Accordingly, it is to be understood that the various embodiments have been described by way of illustration and not limitation.

The invention claimed is:

1. A method for displaying wind characteristics and effects in a broadcast, comprising:
   utilizing a camera to record a sports broadcast;
   determining wind characteristics relative to the sports broadcast from analysis of the sports broadcast itself; and
   rendering graphics in a said sports broadcast displaying said wind in perspective over a venue, including displaying simulated three dimensional wind paths over an area of sports activity in said venue and over surrounding structures.

2. A method in accordance with claim 1, wherein wind is sampled via at least one sampling point in a venue and where analysis of the sports broadcast includes analysis of at least one image thereof.

3. A method in accordance with claim 2, wherein wind is sampled at multiple sampling points and wherein wind characteristics are displayed in said broadcast.

4. A method in accordance with claim 2, wherein said wind characteristics are simulated relative to the broadcast and wherein analysis of wind characteristics includes analysis of more than one image of the broadcast.

5. A method in accordance with claim 2, wherein wind is analyzed relative to broadcasted environmental conditions.

6. A method in accordance with claim 2, wherein wind is analyzed relative to broadcasted ground or atmospheric effects of wind.

7. A method in accordance with claim 6, wherein wind effects on objects in the broadcast are displayed.

8. A method in accordance with claim 7, wherein said effects include one or more of effects on a ball, a vehicle and a player, with overlaying a graphic on said broadcast indicative of wind effects.

9. A method in accordance with claim 8, further comprising measuring thermographics, followed by overlaying a graphic on said broadcast indicative of thermographics.

10. A system for displaying wind characteristics and effects in a broadcast, comprising:
    a camera configured to record a sports broadcast;
    one or more processors having a graphics rendering processing component that is configured to analyze the sports broadcast itself in order to display wind characteristics relative to the sports broadcast; and
    said one or more processors having an output processing component that is configured to output said rendered graphics in a broadcast displaying said wind in perspective over a venue, including displaying simulated three dimensional wind paths over an area of sports activity in said venue and over surrounding structures.

11. A system in accordance with claim 10, wherein wind is sampled via at least one sampling component in a venue.

12. A system in accordance with claim 11, wherein wind is sampled at multiple sampling points via plural sampling components and wherein wind characteristics are displayed in said broadcast.

13. A system in accordance with claim 12, wherein said wind characteristics are simulated relative to the broadcast.

14. A system in accordance with claim 10, wherein wind characteristics are determined from a computer analyzation component configured to analyze said broadcast.

15. A system in accordance with claim 14, wherein wind is analyzed relative to environmental conditions.

16. A system in accordance with claim 15, wherein wind is analyzed relative to ground or atmospheric effects of wind.

17. A system in accordance with claim 16, wherein wind effects on objects in the broadcast are displayed.

18. A system in accordance with claim 17, wherein said effects include one or more of effects on a ball, a vehicle and a player, with overlaying a graphic on said broadcast indicative of wind effects.

19. A system in accordance with claim 18, further comprising a thermographics measuring component, followed by overlaying a graphic on said broadcast indicative of thermographics.

* * * * *